US012617556B2

(12) United States Patent
Deuitch et al.

(10) Patent No.: US 12,617,556 B2
(45) **Date of Patent: \*May 5, 2026**

(54) MATERIAL TRANSFER INTERFACES FOR SPACE VEHICLES, AND ASSOCIATED SYSTEMS AND METHODS

(71) Applicant: Orbit Fab, Inc., Lafayette, CO (US)

(72) Inventors: Alexander Deuitch, Westminster, CO (US); Srinivasan A. Suresh, Louisville, CO (US); Logan Fettes, Lafayette, CO (US); James Cho, Denver, CO (US)

(73) Assignee: Orbit Fab, Inc., Lafayette, CO (US)

( * ) Notice: Subject to any disclaimer, the term of this patent is extended or adjusted under 35 U.S.C. 154(b) by 5 days.

This patent is subject to a terminal disclaimer.

(21) Appl. No.: 18/934,074

(22) Filed: Oct. 31, 2024

(65) Prior Publication Data

US 2025/0289594 A1 Sep. 18, 2025

Related U.S. Application Data

(63) Continuation of application No. 17/864,251, filed on Jul. 13, 2022, now Pat. No. 12,195,204.

(Continued)

(51) Int. Cl.
| | |
|---|---|
| *B64G 1/40* | (2006.01) |
| *F16L 37/127* | (2006.01) |
| *F16L 37/38* | (2006.01) |

(52) U.S. Cl.
CPC .......... *B64G 1/4024* (2023.08); *F16L 37/127* (2013.01); *F16L 37/38* (2013.01)

(58) Field of Classification Search
CPC ........ B64G 1/402; B64G 1/4024; B64G 1/64; B64G 1/641; B64G 1/642; B64G 1/6425;

(Continued)

(56) References Cited

U.S. PATENT DOCUMENTS

| | | | |
|---|---|---|---|
| 2,199,588 A | 5/1940 | Cobham | |
| 2,634,927 A | 4/1953 | Smith | |
| (Continued) | | | |

FOREIGN PATENT DOCUMENTS

| | | |
|---|---|---|
| CN | 103625656 | 3/2014 |
| CN | 205833444 | 12/2016 |
| (Continued) | | |

OTHER PUBLICATIONS

Altius Space Machines, "MagTag Satellite Servicing Interface Workshop at Smallsat Conference," https://aerospace. org/sites/default/files/2019-05/Davis-Mayberry-Penn_OOS_04242019.pdf, Jul. 23, 2018, 3 pages.

(Continued)

*Primary Examiner* — Timothy P. Kelly
(74) *Attorney, Agent, or Firm* — Perkins Coie LLP

(57) ABSTRACT

Material transfer interfaces for space vehicles, and associated systems and methods are disclosed. A representative system includes a first coupler configured to be carried by a first space vehicle, and a first valve device carried by the first coupler. The system further includes a second coupler configured to be carried by a second space vehicle and a second valve device carried by the second coupler. The first coupler includes rotatable and translatable latch arms positioned to engage with and connect to the second coupler. The first valve device incudes a moveable probe that is insertable into the second valve device when the latch arms of the first coupler are connected to the second coupler to transfer fluid between the first and second valve devices.

20 Claims, 26 Drawing Sheets

Related U.S. Application Data

(60) Provisional application No. 63/221,841, filed on Jul. 14, 2021.

(58) Field of Classification Search
CPC ...... B64G 1/645; B64G 1/6457; B64G 1/646; B64G 1/6462; B64G 1/6464; F16K 3/26; F16L 37/127; F16L 37/38
See application file for complete search history.

(56) References Cited

U.S. PATENT DOCUMENTS

| | | | |
|---|---|---|---|
| 2,803,473 A | 8/1957 | Hohman | |
| 3,113,590 A | 12/1963 | Olson | |
| 3,737,117 A | 6/1973 | Belew | |
| 4,023,584 A | 5/1977 | Rogers | |
| 4,195,804 A | 4/1980 | Hujsak et al. | |
| 4,976,399 A | 12/1990 | Bay et al. | |
| 5,222,277 A | 6/1993 | Harvey | |
| 5,299,764 A | 4/1994 | Scott | |
| 6,193,193 B1 | 2/2001 | Soranno et al. | |
| 6,275,751 B1 | 8/2001 | Stallard et al. | |
| 7,114,682 B1 | 10/2006 | Kistler et al. | |
| 7,392,964 B1 | 7/2008 | Anderman | |
| 7,413,148 B2 | 8/2008 | Behrens et al. | |
| 7,559,509 B1 | 7/2009 | Kistler et al. | |
| 7,575,200 B2 | 8/2009 | Behrens et al. | |
| 7,669,804 B2 | 3/2010 | Strack et al. | |
| 7,857,261 B2 | 12/2010 | Tchoryk et al. | |
| 7,861,975 B2 | 1/2011 | Behrens et al. | |
| 8,006,937 B1 | 8/2011 | Romano et al. | |
| 8,333,347 B2 | 12/2012 | Ritter et al. | |
| 8,820,353 B2 | 9/2014 | Yandle et al. | |
| 8,899,527 B2 | 12/2014 | Allen et al. | |
| 9,231,323 B1 | 1/2016 | Jaeger | |
| 10,308,125 B2 | 6/2019 | Ahrens | |
| 10,604,281 B2 | 3/2020 | Raven et al. | |
| 10,654,584 B2 | 5/2020 | Bosma | |
| 10,850,869 B2 | 12/2020 | Nicholson et al. | |
| 11,530,053 B2 | 12/2022 | Wingo et al. | |
| 11,643,226 B1 | 5/2023 | Markcity et al. | |
| 12,037,142 B2 | 7/2024 | Faber | |
| 12,187,466 B2 | 1/2025 | Bulitude et al. | |
| 12,195,204 B2 | 1/2025 | Deuitch et al. | |
| 2002/0164204 A1 | 11/2002 | Kaszubowski et al. | |
| 2002/0179775 A1 | 12/2002 | Turner | |
| 2003/0029969 A1 | 2/2003 | Turner | |
| 2005/0263649 A1 | 12/2005 | Ritter et al. | |
| 2006/0151671 A1 | 7/2006 | Kosmas | |
| 2006/0278765 A1 | 12/2006 | Strack et al. | |
| 2007/0051854 A1 | 3/2007 | Behrens et al. | |
| 2007/0228219 A1 | 10/2007 | Behrens et al. | |
| 2007/0228220 A1 | 10/2007 | Behrens et al. | |
| 2008/0121759 A1 | 5/2008 | Behrens et al. | |
| 2011/0031352 A1 | 2/2011 | Behrens et al. | |
| 2012/0000575 A1 | 1/2012 | Yandle et al. | |
| 2012/0168564 A1 | 7/2012 | Feldmann | |
| 2012/0292449 A1 | 11/2012 | Levin et al. | |
| 2013/0119204 A1 | 5/2013 | Allen et al. | |
| 2016/0028175 A1 | 1/2016 | Jaeger | |
| 2018/0362910 A1 | 12/2018 | Bores et al. | |
| 2019/0023422 A1 | 1/2019 | Nicolson et al. | |
| 2019/0077523 A1 | 3/2019 | Faber | |
| 2020/0346781 A1 | 11/2020 | Bosma | |
| 2021/0070465 A1 | 3/2021 | Bosma | |
| 2021/0284363 A1 | 9/2021 | Licciardello et al. | |
| 2021/0300602 A1 | 9/2021 | Bultitude et al. | |
| 2022/0332444 A1 | 10/2022 | Roopnarine | |
| 2022/0371749 A1 | 11/2022 | Faber | |
| 2023/0016398 A1 | 1/2023 | Faber | |
| 2023/0028104 A1 | 1/2023 | Turner et al. | |
| 2024/0093818 A1 | 3/2024 | Strauss et al. | |

FOREIGN PATENT DOCUMENTS

| | | |
|---|---|---|
| CN | 109703791 | 5/2019 |
| EP | 3012194 | 4/2016 |
| JP | 52033123 | 3/1977 |
| JP | H04293700 | 10/1992 |
| JP | 20120140122 | 7/2012 |
| JP | 2016084130 | 5/2016 |
| WO | 2016020390 | 2/2016 |
| WO | 2023139613 | 7/2023 |

OTHER PUBLICATIONS

Altius Space Machines, "Open Source Analysis of Iridium Failures and the Implications for Big LEO Constellations," https://web.archive.org/web/20190828151326/http://www.altius-space.com/wp-content/uploads/2018/02/AltiusSCAFPresentation-ImplicationsOfIridiumOnBigLEO_12Dec2017.pdf, Dec. 12, 2017, 24 pages.

Altius, "SCAF 2017 Presentation: Open Source Analysis of Iridium Failures and the Implications for Big LEO Constellations," http://altius-space.com/blog/scaf-2017-presentation-open-source-analysis-iridium-failures-implications-big-leo-constellations/, published Feb. 16, 2018, 5 pages.

Cobham, "Service Valve," https://www.cobham.com/mission-systems/space-propulsion-systems/service-valves/service-valves-datasheet/docview/, 2009, 1 page.

EO: Sharing Earth Observation Resources, "CubeSat Concept and the Provision of Deployers Services," https://directory.eoportal.org/web/eoportal/satellite-missions/c-missions/cubesat-concept, accessed: Mar. 25, 2020, 23 pages.

International Search Report and Written Opinion for International Patent Application No. PCT/US22/37019, Applicant: Orbit Fab, Inc., mailed Oct. 26, 2022, 14 pages.

NASA Pamplet, "Partnering and Licensing with NASA Goddard—Satellite Servicing—Solutions for Commercial Space and Other Applications," https://sspd.gsfc.nasa.gov/documents/SSPD_Pamphlet4_FINAL.pdf, accessed: Mar. 25, 2020, 8 pages.

NASA- Bring NASA Technology Down to Earth, "Cooperative Service Valve for In-Orbit Cooperative Satellite Fueling," https://technology.nasa.gov/patent/GSC-TOPS-170, accessed: Mar. 25, 2020, 3 pages.

NASA: Robotics, Automation, and Control, "Cooperative Services Valve for In-Orbit Cooperative Satellite Fueling—Technology Solution," https://ntts-prod.s3.amazonaws.com/t2p/prod/t2media/tops/pdf/GSC-TOPS-170.pdf, accessed: Mar. 25, 2020, 2 pages.

Stoor, Bradley J., "In-Space Manufacturing: A Roadmap to the Future," Air Command and Staff College Air University—Masters of Operational Arts and Sciences, AU/ACSC/STOOR, B/AY18, https://apps.dtic.mil/dtic/tr/fulltext/u2/1055025.pdf, Apr. 2018, 42 pages.

TechCrunch, Startup Battlefield: Finals—Orbit Fab, https://techcrunch.com/video/startup-battlefield-finals-orbit-fab/, Oct. 4, 2019, 12 pages.

YouTube Video: 2019 CubeSat Developers Workshop—Day 2, https://www.youtube.com/watch?v=JgXkUZIN7tk, steamed live Apr. 24, 2019, 3 pages.

MATERIAL TRANSFER INTERFACES FOR SPACE VEHICLES, AND ASSOCIATED SYSTEMS AND METHODS

CROSS-REFERENCE TO RELATED APPLICATION(S)

The present application is a continuation of U.S. patent application Ser. No. 17/864,251, filed on Jul. 13, 2022 (now U.S. Pat. No. 12,195,204), which claims priority to U.S. Provisional Patent Application No. 63/221,841, filed Jul. 14, 2021, each of which is incorporated herein by reference in its entirety.

TECHNICAL FIELD

The present disclosure is directed generally to material transfer interfaces for space vehicles, and associated systems and methods.

BACKGROUND

Existing space systems have several drawbacks. For example, launch vehicles may have limited volume and mass capacities. Spacecraft, such as satellites and/or other machines for traveling in space, are often launched to orbit with a limited quantity of fuel on board due to size and/or cost restrictions that must be balanced when designing the spacecraft for a particular mission. Accordingly, space missions may have limited lifetimes and/or utility due to limited fuel. Likewise, features and functions of spacecraft, such as the type and quantity of payload the spacecraft itself may carry, may be limited and/or compromised because the spacecraft may need to be launched full of all of the fuel it will need for its entire lifetime. Accordingly, there is a need for systems and methods to refuel spacecraft, especially spacecraft with long lifecycles intended to be on orbit for extended periods of time.

Refueling a satellite is difficult or impossible with existing systems. For example, existing docking systems and procedures are complicated and two satellites or vehicles may have incompatible docking systems or no docking systems. Existing docking systems are also difficult or impossible to use autonomously. Existing docking systems also do not simultaneously provide adequate docking capabilities and material transfer interfaces (e.g., for filling and/or draining). Accordingly, there is a need for systems and methods for transferring materials in space that overcome the disadvantages of existing space systems.

DETAILED DESCRIPTION

Figure 1:
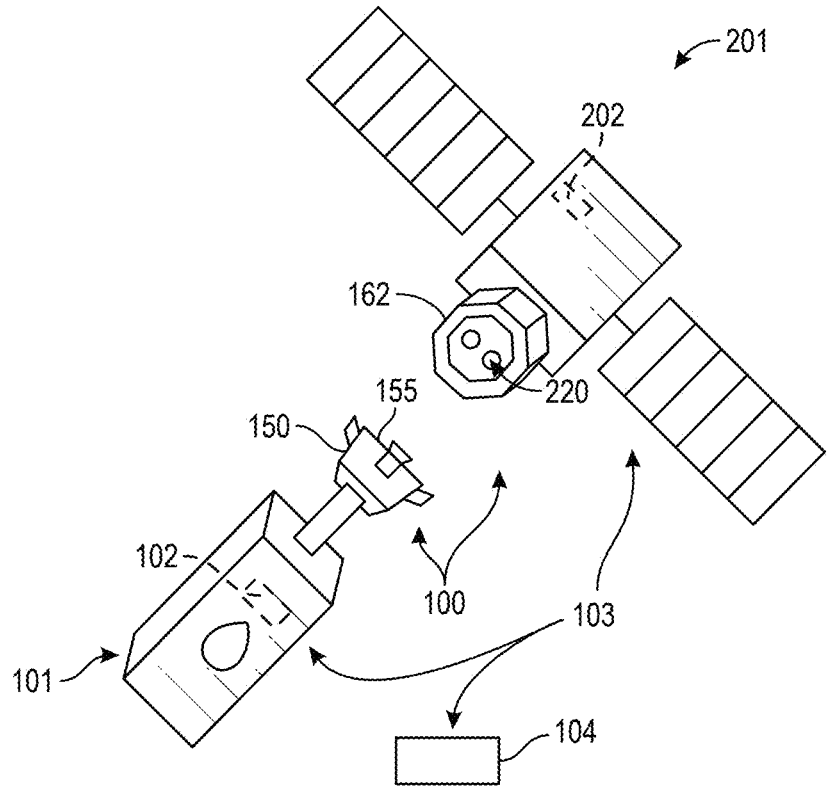
FIG. 1 is a partially schematic, isometric illustration of two space vehicles preparing to couple and transfer material in accordance with embodiments of the present technology.

Several embodiments of the present technology are directed to systems and methods for transferring materials (e.g., liquids, gases, solids, and/or other materials) in space and/or on a planetary and/or lunar surface. A representative system includes a first coupler configured to be carried by a first space vehicle, and a first valve device carried by the first coupler. The system further includes a second coupler configured to be carried by a second space vehicle, and a second valve device carried by the second coupler. The first coupler includes rotatable and translatable latch arms positioned to engage with and connect to the second coupler. The first valve device incudes a moveable probe that is insertable into the second valve device when the latch arms of the first coupler are connected to the second coupler to transfer fluid between the first and second valve devices.

In particular embodiments, the latch mechanism is under-actuated, which is advantageous because it can allow multiple latch arms of the mechanism to be driven by a single actuator. Individual latch arms can be coupled to both an elastic element and a fixedly movable element to move between a closed position and an open position, in a manner that allows the individual latch arms to move independently as they close, while also holding the latch arms in the closed position once closure is complete. In further embodiments, the valves can be positioned in a "check" configuration, to confirm that the valves are properly aligned and sealed before transferring fluids. The latching mechanism can be configured to move to a target state/position in case power is lost, and the target state can be pre-selected from multiple options—e.g., an unlatched state or a latched state. Other representative features include locks to prevent the vehicles from decoupling once the valves are connected, flexible interfaces that allow for minor misalignments during the coupling process, and/or separation devices that push the vehicles apart once the transfer process is complete.

Many specific details of some embodiments of the present technology are set forth in the following description and FIGS. 1-24 to provide a thorough understanding of these embodiments. Well-known structures, systems, and methods that are often associated with such embodiments, but that may unnecessarily obscure some significant aspects of the disclosure, are not set forth in the following description for purposes of clarity. Moreover, although the following disclosure sets forth some embodiments of the technology, other embodiments of the technology can have different configurations and/or different components than those described herein. As such, the technology can include embodiments with additional elements, and/or without several of the elements described below with reference to FIGS. 1-24.

Several embodiments of the technology described below can take the form of computer- or controller-executable instructions, including routines executed by a programmable computer or controller. Those skilled in the relevant art will appreciate that the technology can be practiced on computer/controller systems other than those shown and described below. The technology can be embodied in a special-purpose computer, controller, or data processor that is specifically programmed, configured, or constructed to perform one or more of the computer-executable instructions described below. Accordingly, the terms "computer" and "controller" as generally used herein refer to any data processor and can include Internet appliances and hand-held devices (including palm-top computers, wearable computers, cellular or mobile phones, multiprocessor systems, processor-based or programmable consumer electronics, network computers, mini computers and the like). Information handled by these computers can be presented at any suitable display medium, including an LCD.

The technology can also be practiced in distributed environments, where tasks or modules are performed by remote processing devices that are linked through a communications network. In a distributed computing environment, program modules and/or subroutines can be located in local and remote memory storage devices. Aspects of the technology described below can be stored and/or distributed on computer-readable media, including magnetic or optically readable or removable computer disks, as well as distributed electronically over networks. Data structures and transmissions of data particular to aspects of the technology are also encompassed within the scope of the embodiments of the technology.

Reference is made herein to "space." Space includes orbital space near or around the Earth, the Moon, and/or another planetary body. A person of ordinary skill in the art will also recognize that embodiments of the present technology can be implemented near other planetary or lunar surfaces. Reference is also made herein to fuel and propellant. A person of ordinary skill in the art will understand that the terms fuel and propellant can be used interchangeably when referring to a substance for powering and/or propelling a spacecraft, and can include oxidizers that function as propellant when combined with fuels. A person of ordinary skill in the art will also understand that when reference is made to transferring a fuel or propellant, corresponding embodiments can be used to transfer other materials, such as a pressurant, water, coolant, waste, and/or other materials that can be transferred between two vehicles and/or other containers. In addition, a person of ordinary skill in the art will understand that a spacecraft can include any human-made object in space.

A. System Overview

The present disclosure describes systems and/or devices, including material transfer interfaces, configured to facilitate transferring materials (such as fluids, including fuel, propellant, and/or other materials) between containers (such as containers carried by spacecraft) in an extraterrestrial environment, such as in space, or on extraterrestrial bodies such as moons, planets, and/or asteroids, and/or on Earth or within Earth's atmosphere. The present technology also includes coupling systems for connecting spacecraft to each other, such as in a rendezvous and/or docking maneuver. Accordingly, embodiments of the present technology provide spacecraft with the capability to refuel and extend their useful life and/or to expel waste materials, among other advantages. Although some embodiments are directed to autonomous material transfer activities, activities performed by systems and/or spacecraft disclosed herein can be semi-autonomous or non-autonomous, and can include assistance by robots, artificial intelligence, and/or humans.

FIG. 1 is a partially schematic, isometric illustration of a first space vehicle 101 (e.g., a first spacecraft) positioned to dock with a second space vehicle 201 (e.g., a second spacecraft) to transfer materials between the two space vehicles. In a particular embodiment, the first space vehicle 101 is or includes a service vehicle, for example, a space tug, or a fuel transfer vehicle. The second space vehicle 201 can be or include a satellite, or another space vehicle to which materials are delivered, and/or from which materials are received. To transfer materials between the two space vehicles, each space vehicle includes a portion of an overall transfer interface system 100. Accordingly, the first space vehicle 101 can include a first coupler 150, and the second space vehicle 201 can include a second coupler 210. In many instances, fluids are transferred between the first space vehicle 101 and the second space vehicle 201. For example, and as described above, suitable fluids can include propulsion fluids transferred from the first space vehicle 101 to the second space vehicle 201 to enable the second space vehicle 201 to carry out further missions. Accordingly, the first coupler 150 can include a first valve device 160, and the second coupler 210 can include a second valve device 220. When the two couplers 150, 210 are connected, the two valve devices 160, 220 can transfer fluids and/or other materials between the two vehicles. Further details of representative systems for coupling the vehicles and, specifically, transferring fluids between the vehicles, are described below.

The transfer interface system 100 can include a controller system 103 that, with or without human assistance, directs the operation of coupling the two space vehicles 101, 201, and/or transferring materials between the two space vehicles. The controller system 103 can accordingly include a first controller 102 carried by the first space vehicle 101, and a second controller 202 carried by the second space vehicle 201. The controller system 103 can further include an off-board controller 104 that is carried by neither the first space vehicle 101 nor the second space vehicle 201, but is instead located externally. For example, the off-board controller 104 can be carried or positioned on Earth.

Figures 2A, 2B, 2C, 2D:
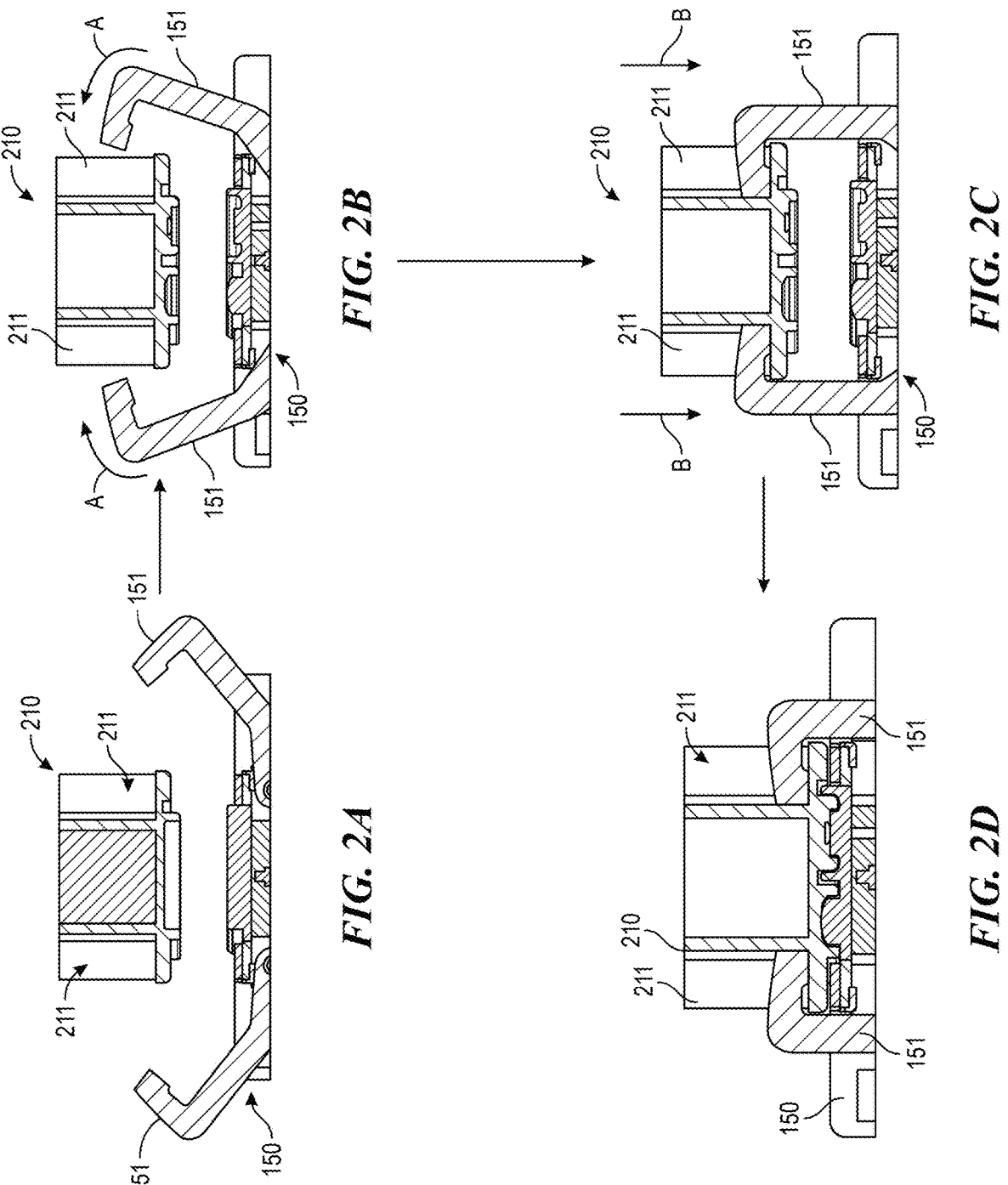
FIGS. 2A-2D are partially schematic, cross-sectional illustrations of a sequence for connecting two space vehicles in accordance with embodiments of the present technology.

FIG. 2A is a partially schematic, cross-sectional, and simplified illustration of the first coupler 150, carried by the first space vehicle 101 shown in FIG. 1, and the second coupler 210, carried by the second space vehicle 201, also shown in FIG. 1. The first coupler 150 can include one or more latch arms 151 (two are shown in FIG. 2A) that are configured to be received in corresponding arm receivers 211 carried by the second coupler 210. The process for connecting the two couplers 150, 210 can include a "soft latch" process, and a "hard latch" process. The soft latch process positions the two couplers 150, 210 close to each other, but with tolerance for at least some movement by either spacecraft. The hard latch process eliminates or at least significantly reduces/minimizes relative movement between the two space vehicles. In the hard latch configuration, the two couplers 150, 210 are sufficiently latched to begin a fluid transfer process.

In FIG. 2B, the latch arms 151 have begun to pivot toward the arm receivers 211, as indicated by arrow A. In FIG. 2C, the two latch arms 151 have been received in the corresponding arm receivers 211, to place the two couplers 150, 210 in the soft latch configuration. In this configuration, each coupler 150, 210 can move slightly with respect to the other, but the latch arms 151 prevent either coupler from completely disengaging from the other.

Once the latch arms 151 have completed the soft latch maneuver, the latch arms move downwardly, toward the first coupler 150, as indicated by arrows B. As is shown in FIG. 2D, the latch arms 151 have moved to a full downward position, preventing further motion between the first coupler 150 and the second coupler 210 in a hard latch configuration. At this point, the two couplers 150, 210 are sufficiently latched to each other to begin a fluid transfer process. Details of that process will be described later with reference to FIGS. 23A-23C.

B. Coupling/Latching Elements—First Vehicle

Figure 3:
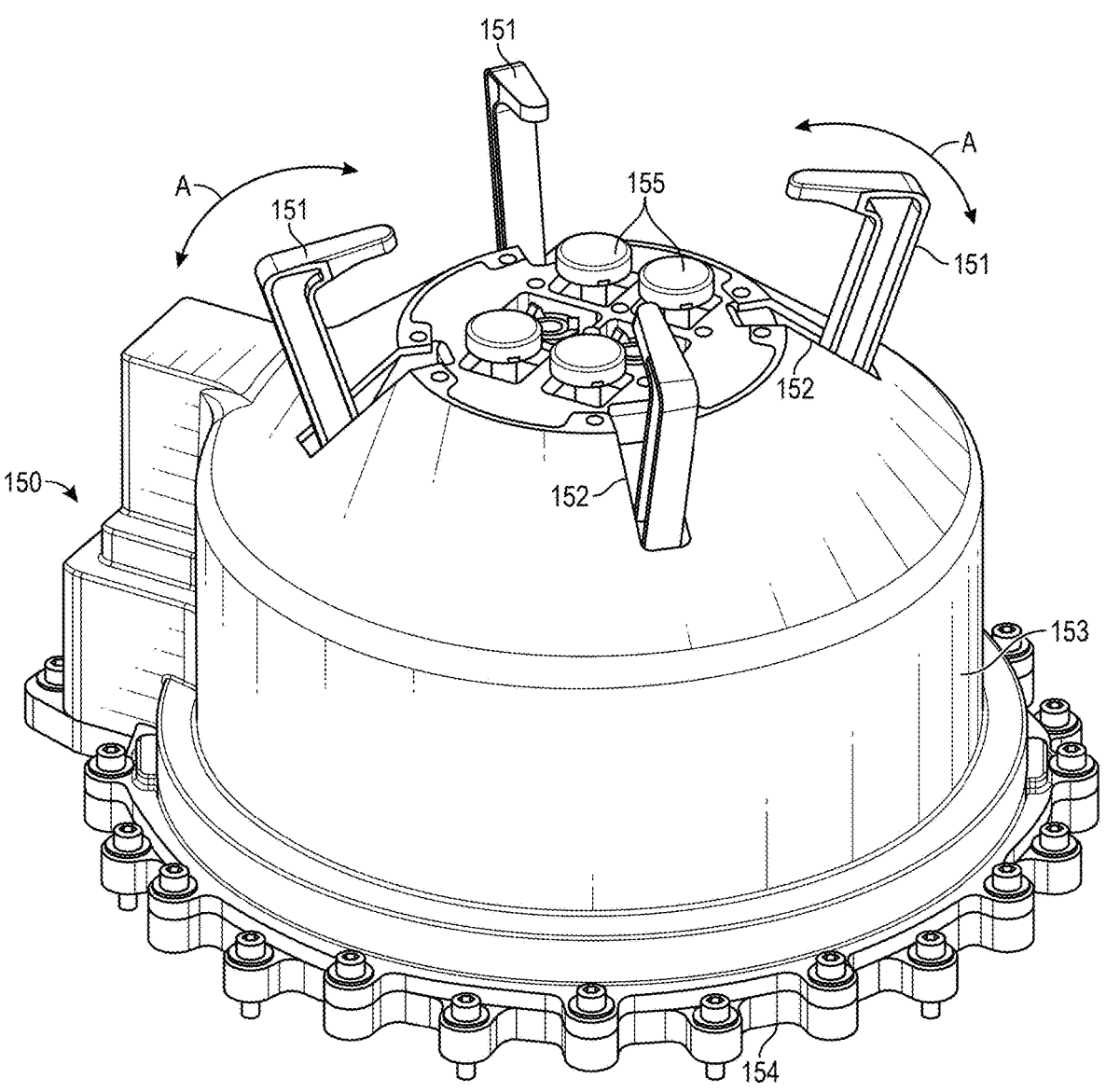
FIG. 3 is a partially schematic, isometric illustration of a first coupler used to couple a first space vehicle to a second space vehicle in accordance with embodiments of the present technology.

FIG. 3 is a partially schematic, isometric illustration of the general layout of a representative first coupler 150. The first coupler 150 can include a housing 153 that surrounds internal mechanical and electronic components. The housing 153 is attached to an attachment flange 154, which is in turn attached to the first space vehicle 101 (FIG. 1). The housing 153 can include multiple housing slots 152, each configured to receive a corresponding latch arm 151 in a manner that allows the latch arms 151 to pivot inwardly toward each other and outwardly away from each other, as indicated by arrow A. In the illustrated configuration, the first coupler 150 includes four latch arms 151 that are configured to undergo such motions. Other embodiments can include other suitable numbers of latch arms. As is also illustrated in FIG. 3, the first coupler 150 can include one or more separators, e.g., contact plungers 155 (four are shown in FIG. 3). The contact plungers 155 (and/or other suitably configured separators) can store energy as the two space vehicles are coupled, and release the energy to help separate the space vehicles when they are decoupled. For example, the separators can be compressed when the first coupler 150 is connected to its corresponding second coupler, and can store energy (e.g., via a compressed spring) to aid in separating the two couplers when the fluid transfer process is complete. Further details are described below with reference to FIGS. 4A-4D and 6.

Figures 4A, 4B:
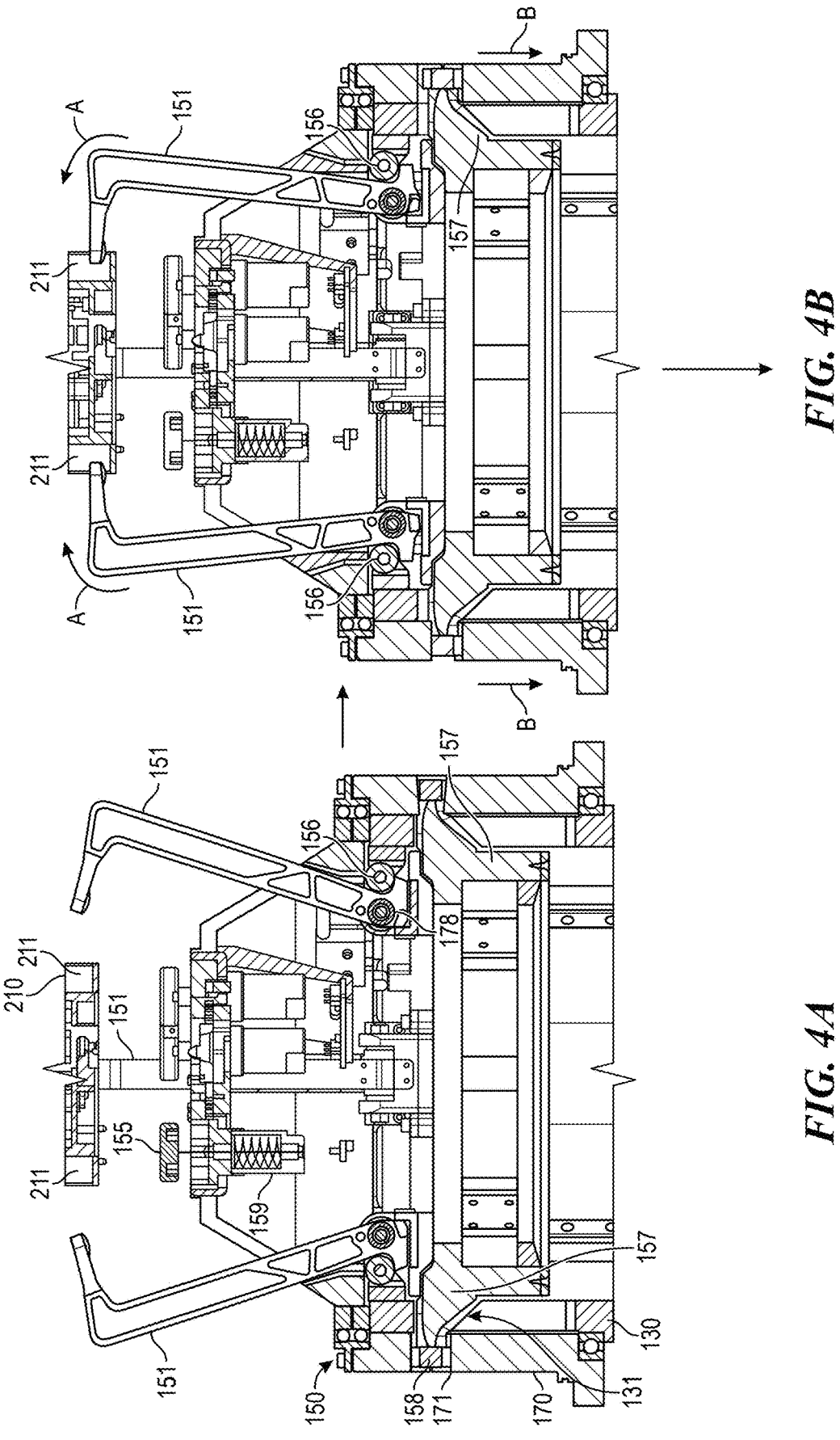
FIGS. 4A-4D are partially schematic, cross-sectional illustrations of a sequence, similar to that shown in FIGS. 2A-2D, with further system details configured in accordance with embodiments of the present technology.

FIGS. 4A-4D illustrate, via cross-sectional views, a sequence for connecting the first coupler 150 to the second coupler 210, in the same manner as was described above with reference to FIGS. 2A-2D, but with further details of the operation included. Beginning with FIG. 4A, the first coupler 150 includes the four latch arms shown in FIG. 3, only three of which are visible in FIG. 4A, due to the cross-sectional nature of the Figure. Similarly, only three of the four contact plungers 155 are visible in FIG. 4A. FIG. 4A also illustrates the second coupler 210, in a position to receive the latch arms 151 carried by the first coupler 150. The motion of the latch arms 151 can be controlled by an arm guide 156, as will be described in further detail below. The latch arms can be biased toward an open position or a closed position (depending on design considerations) by corresponding springs (e.g., an arm spring 178) and/or other suitable devices. The latch arms 151 are carried by a latch arm carrier 157 and are driven to rotate and translate by virtue of the motion of the latch arm carrier 157. The latch arm carrier 157 includes two cam followers 158 that extend outwardly into a corresponding slot 171 of a cam tube 170. As the cam tube 170 rotates, the interaction between the cam follower 158 and the cam slot 171 drives the latch arm carrier 157 downwardly, closing the latch arms 151, and pulling the second coupler 210 toward the first coupler 150.

A support tube 130 is positioned concentrically between the cam tube 170 and latch arm carrier 157. The support tube 130 has a fixed position relative to the rotating cam tube 170 and the translating latch arm carrier 156. Accordingly, the support tube 130 carries the arm guide 156 (to control the translational motion of the latch arms 151) and has a support tube slot 131. The support tube slot 131 allows the cam follower 158 (positioned radially inwardly from the support tube 130) to access the cam slot 171 (positioned radially outwardly from the support tube 130).

FIG. 4A also illustrates, for a representative one of the contact plungers 155, a plunger spring 159 that stores energy when compressed during the coupling process. That energy can be released when the first and second couplers 150, 210 are disengaged, to aid in separating the two space vehicles.

Figures 4C, 4D:
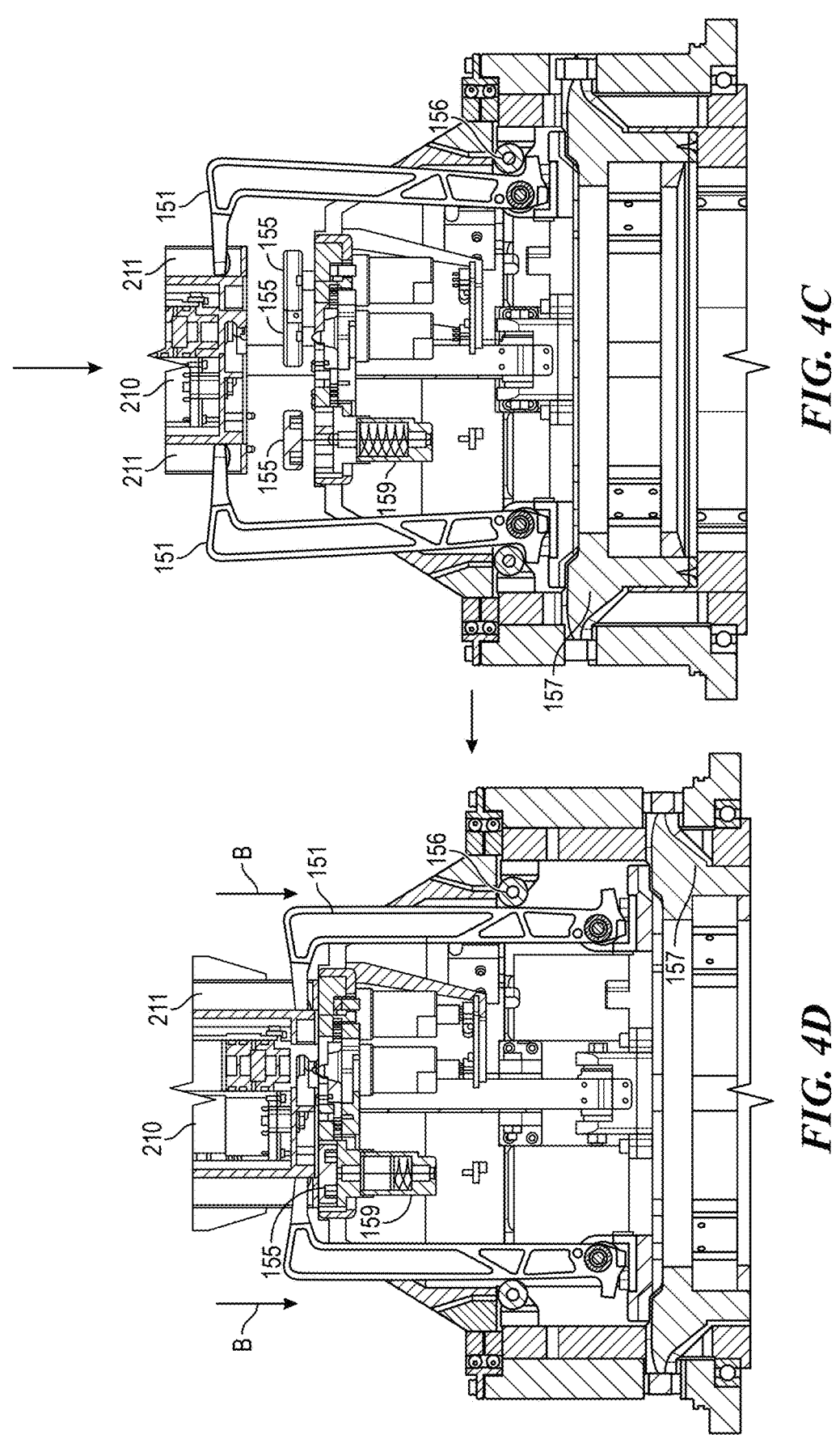

In FIG. 4B, the latch arm carrier 157 has begun its downward movement, as indicated by arrow B, and the latch arms 151 are forced to rotate inwardly toward each other, as indicated by arrow A, due to contact with the corresponding arm guides 156. As described further below, the motion of the latch arms 151 can be less than fully constrained, and the latch arms 151 may move toward and away from the arm guides 156 as they close toward each other. That is, the latch arms 151 can have at least one unrestricted degree of freedom in this portion of the operation. In particular embodiments, the arm guides 156 include rollers that contact an outwardly facing surface of the corresponding latch arms 151. In other embodiments, the arm guides 156 can have other suitable configuration. In FIG. 4C, the latch arms 151 have completed their inward rotation and have now completed the soft latch operation. Accordingly, the latch arms 151 are fully received in the arm receivers 211 of the second coupler 210. At this point, the latch arms 151 are not actuated to rotate further, but continue to move downwardly, as indicated by arrows B, as the latch arm carrier 157 moves downwardly. In addition, the latch arms 151 can still allow some relative lateral movement between the first and second couplers 150, 210, but can act to center the two couplers relative to each other, and/or dampen or reduce such relative motion, as is also described further below.

In FIG. 4D, the latch arm carrier 157 has completed its downward motion, thus also completing the hard latch operation. In this position, the second coupler 210 is firmly engaged with the first coupler 150, and the contact plungers 155 are now compressed as a result of the first and/or second couplers 150, 210 being drawn together. Each contact plunger 155 presses against the plunger spring 159. Accordingly, when the contact plungers 155 are fully depressed, energy is stored in the plunger springs 159. When the second coupler 210 is released from the first coupler 150, the stored energy in the plunger springs 159 tends to push the contact plungers 155 upwardly to aid in pushing the second coupler 210 (and the second space vehicle to which it is attached) away from the first coupler 150 (and the first space vehicle to which it is attached).

Figure 5:
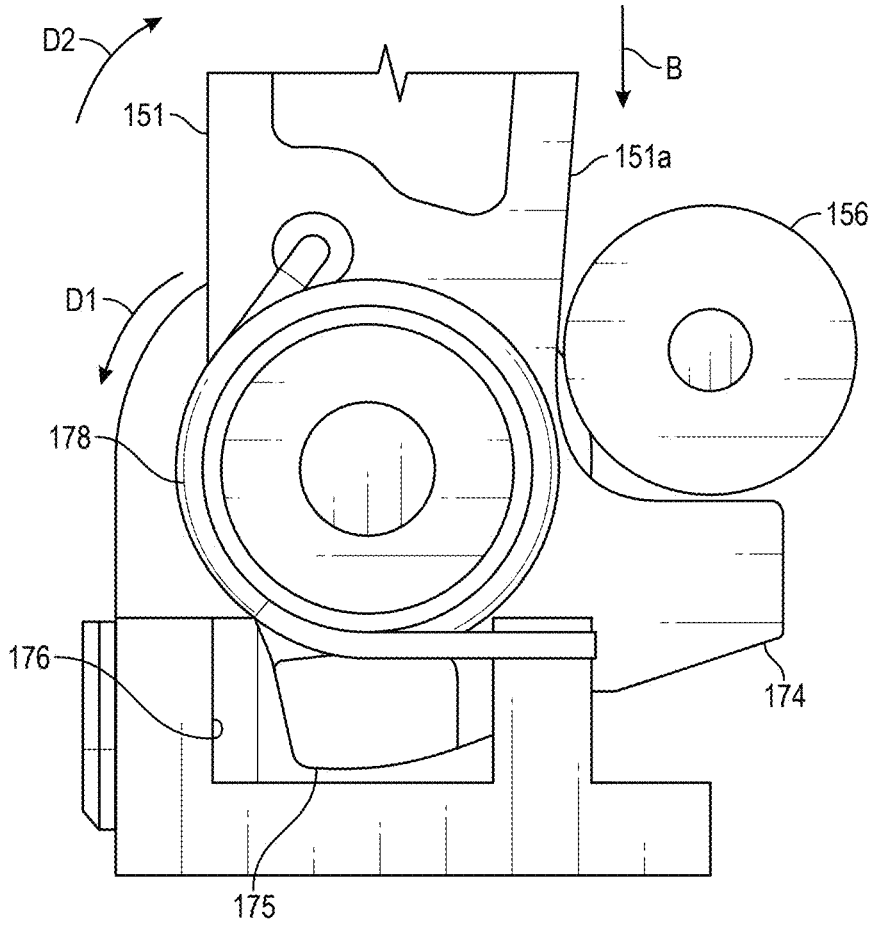
FIG. 5 is a partially schematic side view of an arrangement for controlling the motion of a latch arm, in accordance with embodiments of the present technology.

FIG. 5 is a partially schematic, side view of a portion of one of the latch arms 151, illustrating the interaction between the latch arm 151 and the arm guide 156. The latch arm 151 is coupled to an arm spring 178 which tends to bias the latch arm 151 toward its closed position, as indicated by arrow D1. The latch arm 151 includes a stop tab 175 that limits the rotation of the latch arm 151. For example, when the latch arm 151 is rotated clockwise (arrow D2) to its fully opened position, the stop tab 175 engages a corresponding full open stop surface 176. In order to open the latch arm 151, the latch arm 151 is moved downwardly, as indicated by arrow B, such that a latch opening tab 174 engages the arm guide 156. This contact forces the latch arm 151 to rotate clockwise as indicated by arrow D2, allowing the latch arm 151 to disengage from the corresponding second coupler, from the position shown in FIG. 4B to the position shown in FIG. 4A. As described above, the motion of the second space vehicle away from the first space vehicle can be initiated and/or accelerated by the contact plunger(s).

One feature of embodiments of the mechanism described above is that it can be underactuated, and/or the motion of the latch arms 151 can be more constrained in some positions than in others. For example, the latch arms 151 can be fully constrained when in the open and closed positions, but less constrained when in between these positions. In particular, the arm springs 178 can bias the latch arm 151 toward, but not fully to, the closed position. This force is elastic. The arm guide 156, which is rigid (or at least approximately rigid), holds the latch arm 151 in the open position by acting on the latch opening tab 174. The latch arm guide 156 holds the latch arm 151 in the closed position by acting on the back surface 151a of the latch arm 151. When the latch arm 151 is in an intermediate position, neither the arm spring 178, nor the latch arm guide 156 constrain the latch arm 151 to a particular position. Accordingly, the latch arm spring 178 biases the latch arm 151 against the corresponding receiver 211 of the second space vehicle (see, e.g., FIG. 4B), even if the two space vehicles and their corresponding couplers are not perfectly aligned, initially and/or as the coupling process proceeds. This approach allows the latch arms 151 constrain the relative motion between the two space vehicles, and absorb energy, via the arm springs 178, to reduce that motion.

Figure 6:
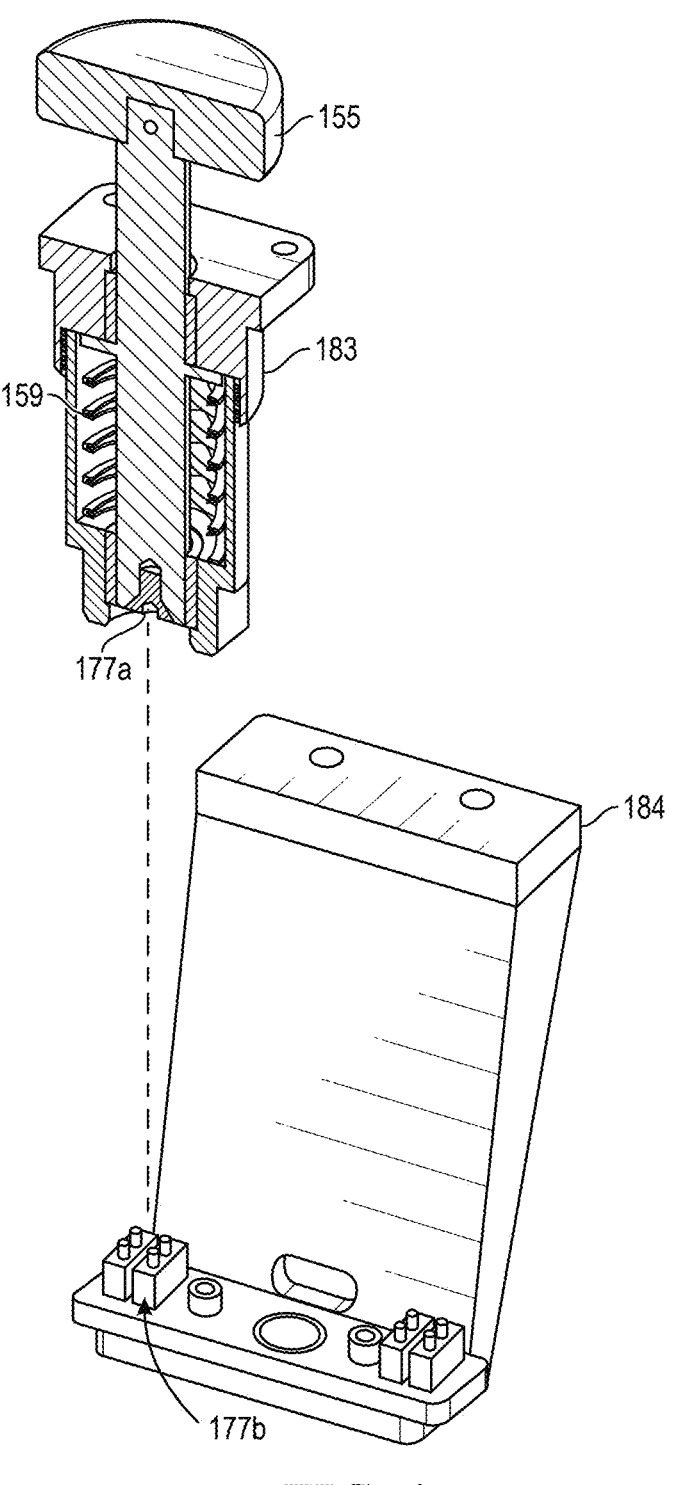
FIG. 6 is a partially schematic, partial cross-sectional exploded view of a plunger used to store energy when two space vehicles are coupled together.

FIG. 6 is a partially exploded illustration of an arrangement for carrying and deploying the contact plungers 155, one of which is shown in FIG. 6. In particular, the contact plunger 155 can be carried by a plunger housing 183 that also carries the plunger spring 159. The plunger housing 183 in turn can be positioned relative bracket 184, which has a fixed position relative to the moving contact plunger 155. When the contact plunger 155 is depressed, it stores energy in the plunger spring 159. When the latch arm 151, described above with reference to FIGS. 4A-5, disengages from the second coupler 210, the plunger spring 159 pushes the contact plunger 155 upwardly, and therefore also pushes the second coupler and the second space vehicle away. The location of the contact plunger (e.g., extended, depressed and/or an intermediate position) can be detected via a first sensor element 177a carried by the contact plunger 155, and a second sensor element 177b (e.g., one or more switches) carried by the bracket 184.

Figure 7:
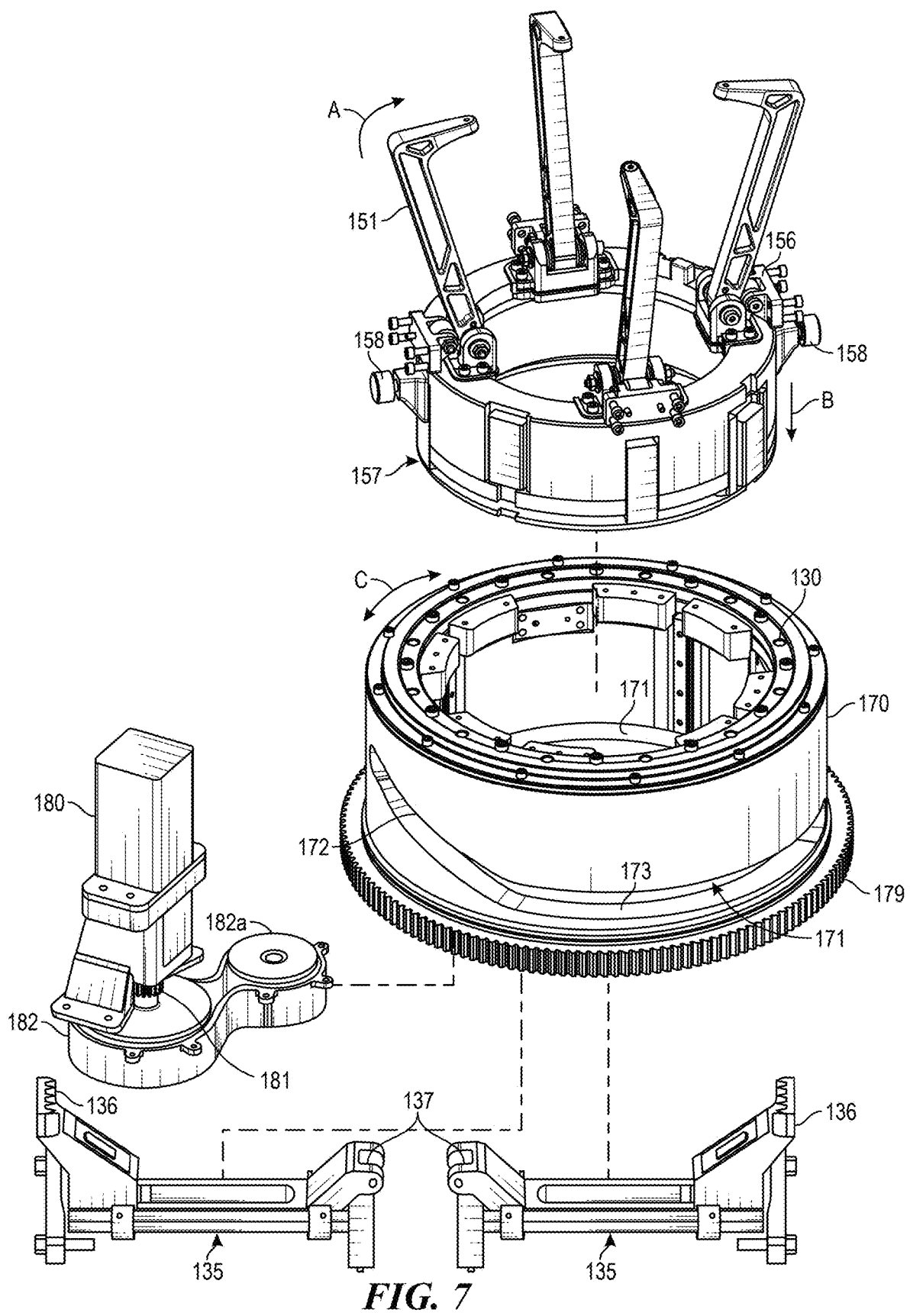
FIG. 7 is a partially schematic, exploded view of elements included in a first coupler configured in accordance with embodiments of the present technology.

FIG. 7 is a partially exploded illustration of an arrangement for driving the latch arms 151. The latch arms 151 are pivotably coupled to the latch arm carrier 157, as described above. The latch arm carrier 157 includes one or more cam followers 158, that extend outwardly in a radial direction. The latch arm carrier 157 fits into the annular opening of the support tube 130 and the cam tube 170, and the cam followers 158 are received in corresponding circumferentially-extending cam slots 171 of the cam tube 170. Each cam slot 171 includes a first (e.g., flat) portion 173 and a second (e.g., inclined) portion 172. The first portion 173 extends circumferentially without an axial component, and the second portion 172 includes an axial component. That is, the second portion 172 extends in a direction that includes a component aligned with the axis of rotation of the cam tube 170. The cam tube 170 further includes a ring gear 179, which engages with a corresponding drive gear 181. The drive gear 181 is coupled to an electric motor (or other suitable actuator) 180, and a spring motor 182. When the actuator 180 drives the drive gear 181, the drive gear rotates the ring gear 179, and the ring gear 179 and the cam tube 170 rotate together relative to the latch arm carrier 157, as indicated by arrow C. As the cam tube 170 rotates counterclockwise, the cam followers 158 enter the inclined portions 172 of the cam slots 171. This motion forces the latch arm carrier 157 downwardly (arrow B), which closes the latch arms 151 (arrow A), and draws them downwardly, in the manner described above with reference to FIGS. 4A-4D. The spring motor 182 and a corresponding take-up spool 182a store energy so as to place the latch arms 151 in a pre-selected target configuration, in case the actuator 180 loses power. The target configuration can be closed (coupled) or open (decoupled), and be selected based on the requirements for particular vehicles and/or missions.

Also shown in FIG. 7 are two cam tube locks 135. Each cam tube lock 135 can be movable or otherwise changeable from a first (e.g., unlocked or disengaged) position in which the cam tube 170 is free to rotate under the power of the actuator 180, and a second (e.g., locked or engaged) position in which the cam tube is prohibited or in least significantly inhibited from moving. For example, the cam tube lock 135 can include a set of locking teeth 136 that engage with the ring gear 179 to prevent the ring gear from inadvertently being rotated, for example, when the corresponding valves are engaged with each other and transmitting fluids or other materials between the two space vehicles. The cam tube lock 135 also includes a valve coupling portion 137. The valve coupling portion 137 can be operatively coupled to the first valve device 160 (FIG. 1) so as to lock the cam tube 170 in position when the first valve device is open and configured to transmit fluids.

Figure 8:
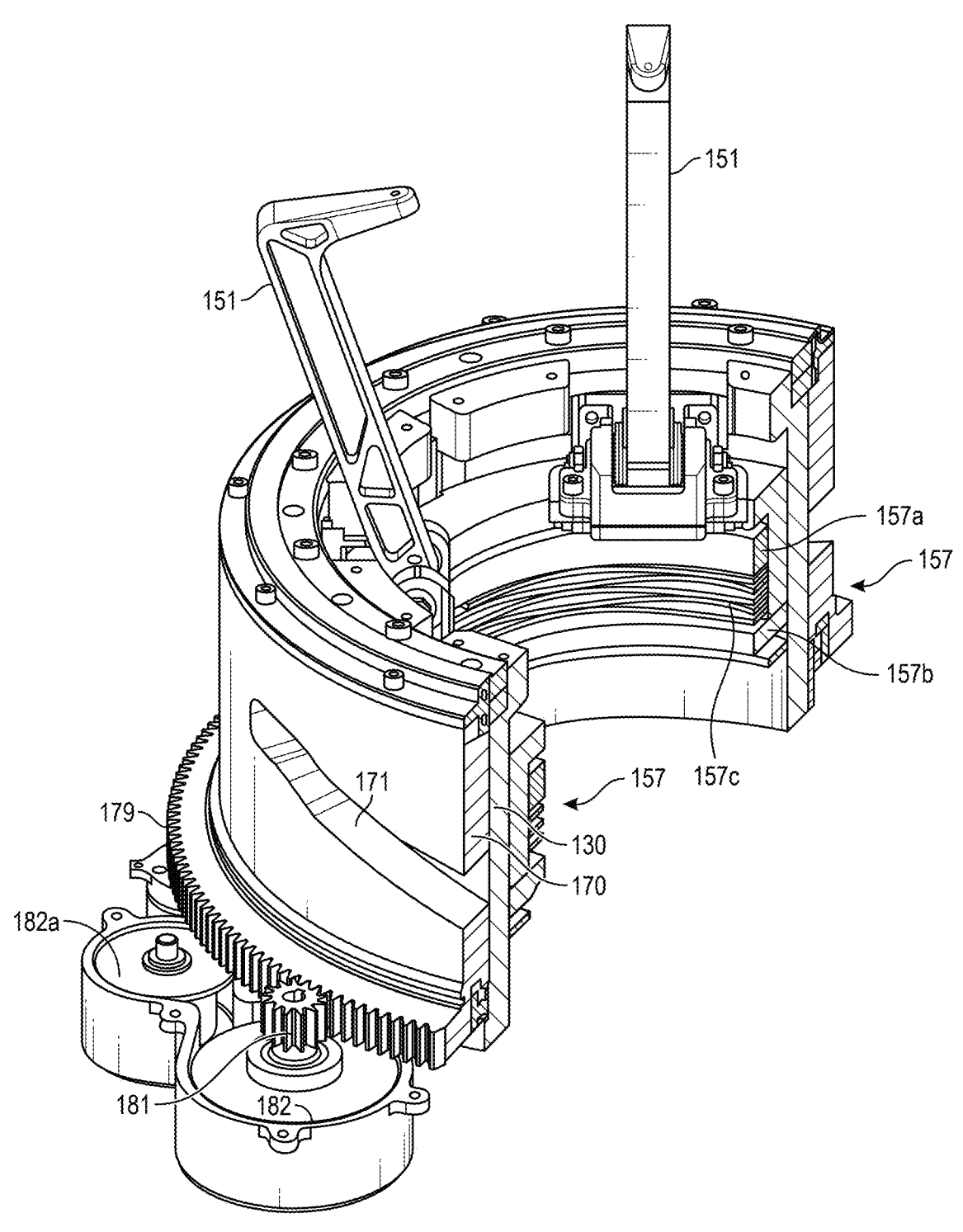
FIG. 8 is a partially schematic, cross-sectional view of a portion of the assembled elements of FIG. 7, configured to move coupler latch arms in accordance with embodiments of the present technology.

FIG. 8 is a cross-sectional unexploded illustration of a portion of the arrangement shown in FIG. 7. As shown in FIG. 8, the cam tube 170 is positioned radially outwardly from the support tube 130, which carries the arm guides 156 (FIG. 7). The latch arms 151 are carried by the latch arm carrier 157, positioned radially inwardly from the support tube 130. The drive gear 181 engages the ring gear 179, and the spring motor 182 provides a return force to bias the latch arms 151 to a coupled (or decoupled) position, in the event the electric motor loses power.

As is also shown in FIG. 8, the latch arm carrier 157 can include multiple elements that are moveable relative to each other. For example, the latch arm carrier 157 can include a first element 157*a* that carries the cam followers 158 (shown in FIG. 7), which engage the cam slot 171. The latch arm carrier 157 can further include a second element 157*b* that is in turn connected to the latch arms 151. A third element 157*c* (e.g., a spring or other resilient element) is positioned between the first and second elements 157*a*, 157*b*. When the first element 157*a* is forced downwardly by the interaction between the cam follower and the cam slot 171, it bears against the third element 157*c*, which in turn bears against the second element 157*b*. The downward motion of the second element 157*b* draws the latch arms 151 downwardly. The flexible, resilient characteristics of the third element 157*c* allow for possible misalignments that might otherwise constrain the ultimate motion of the latch arms 151. Such misalignments may result from manufacturing tolerances, differential thermal expansion, and/or other effects. The third element 157*c* can also transmit loads to the latch arms 151 in a way that ensures at least a minimum clamping load (between the latch arms 151 and the second space vehicle) is achieved, over a target tolerance range.

C. Valve Operation—First Vehicle

Figure 9:
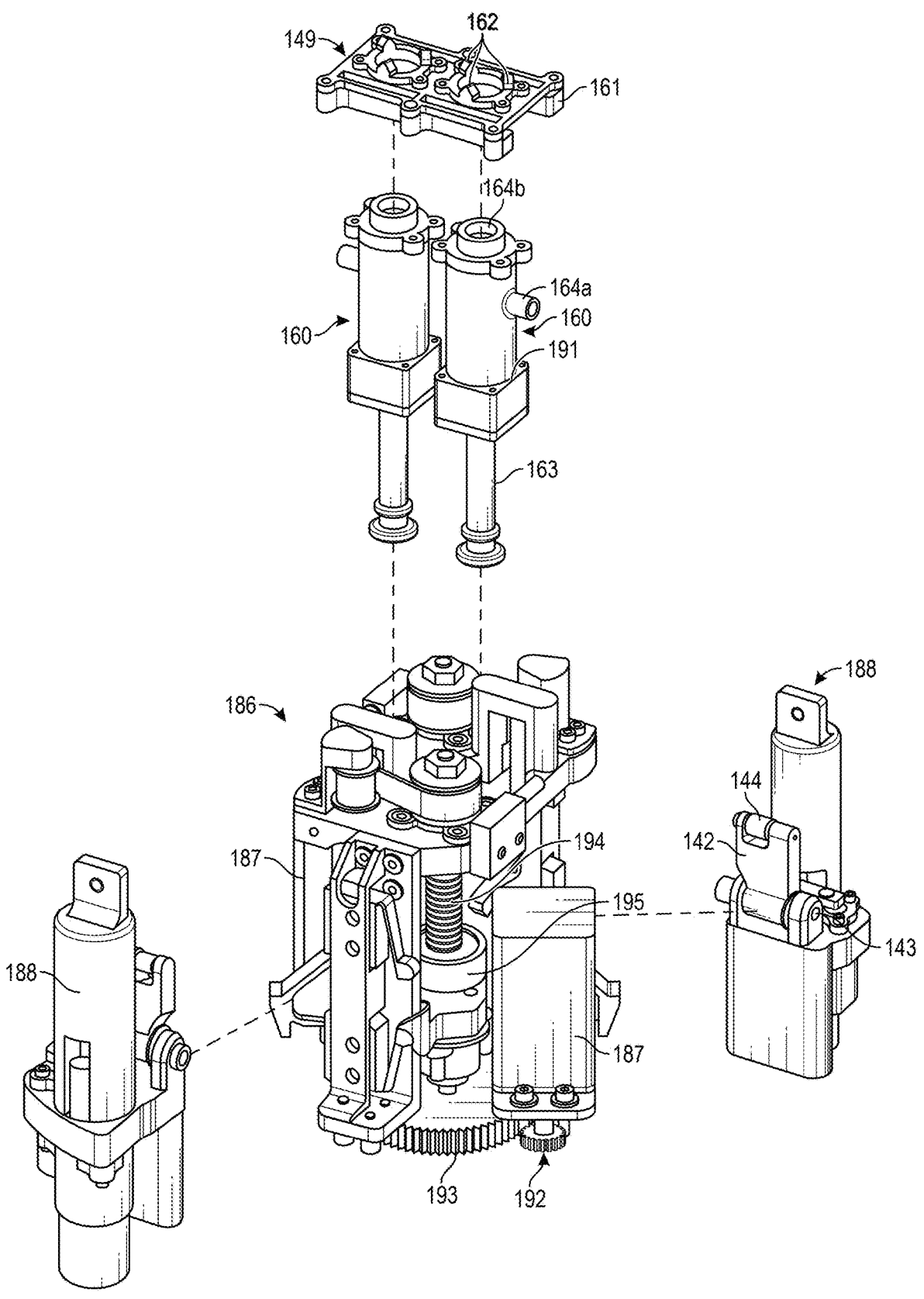
FIG. 9 is a partially schematic, partially exploded illustration of elements included in a valve drive assembly configured in accordance with embodiments of the present technology.

The foregoing section described a representative system and a corresponding method for releasably coupling two spacecraft together to transfer material (e.g., fluids) between the spacecraft. The following discussion, with reference to FIGS. 9-14, describes the valve arrangement carried by the first space vehicle. Beginning with FIG. 9, the first coupler 150 can include a valve drive assembly 186. The valve drive assembly 186 can be used to drive one or more first valve devices 160 (two are shown in FIG. 9). As shown in FIG. 9, the valve drive assembly 186 can include two drive motors 187, each of which includes a drive motor gear 192 that engages with an intermediate gear 193. Each intermediate gear 193 is connected to a corresponding shaft that also carries a screw or worm 194. Accordingly, when the drive motor 187 is actuated, it rotates the screw 194. The screw 194 is engaged with a nut 195, and the nut 195 is engaged with the corresponding first valve device 160, in a manner described later with reference to FIG. 12.

Each first valve device 160 includes a valve housing 191, a first port 164*a*, and a second port 164*b*. When the first valve device 160 is closed, no fluid communication exists between the first port 164*a* and the second port 164*b*. When the first valve device 160 is opened, the two ports 164*a*, 164*b* are in fluid communication with each other. The first valve device 160 is changed between the open and closed configurations by moving a probe 163 projecting outwardly from the valve housing 191.

To avoid having to power the drive motors 187 continuously, once the drive motors have moved the first valve device 160 to the appropriate position, a corresponding valve locking device 188 can be used to lock the valve in position, and the motor 187 can be powered off. The valve locking device 188 can accordingly include a locking arm 142 having a lock element 144 that pivots about a pivot joint 143 so as to engage with the mechanism that drives the first valve device 160 to its open position. Further details of this operation will be described later with reference to FIG. 12.

The valve housings 191 can be attached to a corresponding valve positioning bracket 161. The valve positioning bracket 161 can include first alignment features 149. In a particular embodiment, the first alignment features 149 include positioning tabs 162. In other embodiments, the alignment features 149 can include other configurations, but in any of these embodiments, the first alignment features interface with corresponding second alignment features carried by the second valve device, as described further below.

Figure 10:
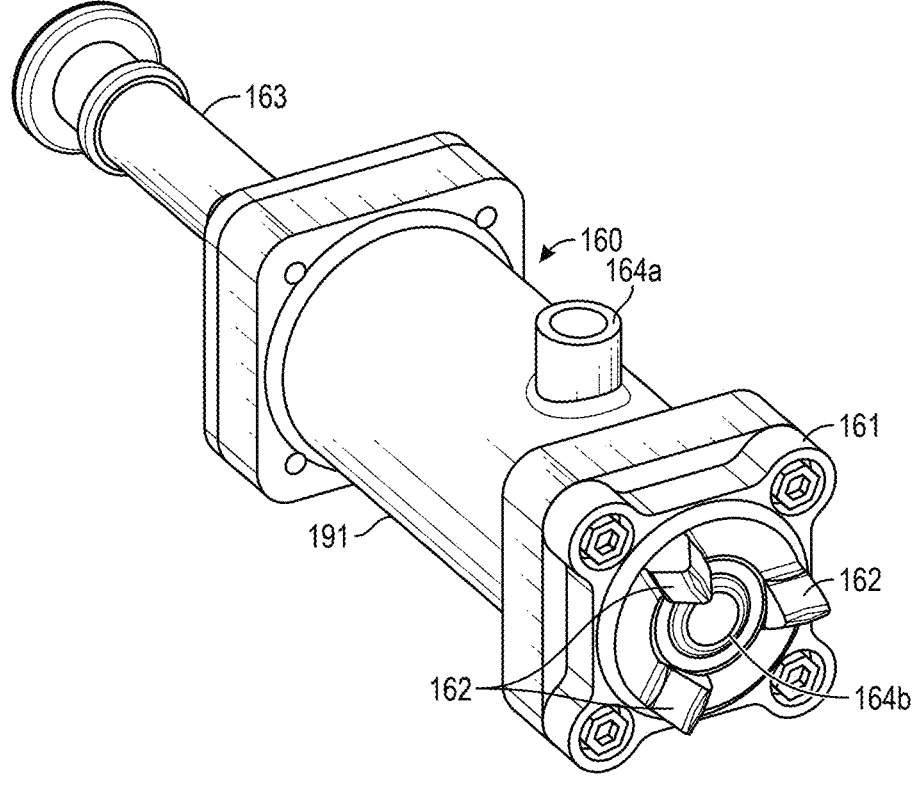
FIG. 10 is a partially schematic, isometric illustration of a valve device configured for a space vehicle in accordance with embodiments of the present technology.

FIG. 10 is an enlarged view of the first valve device 160 described above, illustrating the probe 163, the valve housing 191, and the first and second ports 164*a*, 164*b*. As described above, the first valve device 160 further includes a positioning bracket 161 having one or more first alignment features 149. The alignment features 149 can include positioning tabs 162 having a "canoe sphere" or otherwise pointed or inclined shape. The shape is particularly selected to engage and align with corresponding alignment features carried by the second spacecraft, as will be described further with reference to FIG. 15.

In particular embodiments, the two opposing inclined major surfaces of each positioning tab 162 contact a corresponding surface of the alignment features of the second spacecraft at a single location, thereby exactly constraining the relative motion between the two sets of alignment features in six axes. In particular embodiments, the positioning bracket 161 (and/or the positioning tabs 162 or other alignment features) can have a greater flexibility (or a reduced rigidity) in one axis than another. For example, the positioning bracket 161 can be stiffer along a longitudinal axis than a lateral axis, where the longitudinal axis is generally parallel to the motion of the probe 163 and/or the translation motion of the latch arms, and the lateral axis is transverse to the longitudinal axis. This feature can account for minor misalignments between the two space vehicles as the vehicles couple. Once the vehicles are coupled, the probe 163 moves axially to open and close the communication between the first port 164*a* and the second port 164*b*, as described further below with reference to FIGS. 11A-11C.

Figures 11A, 11B, 11C:
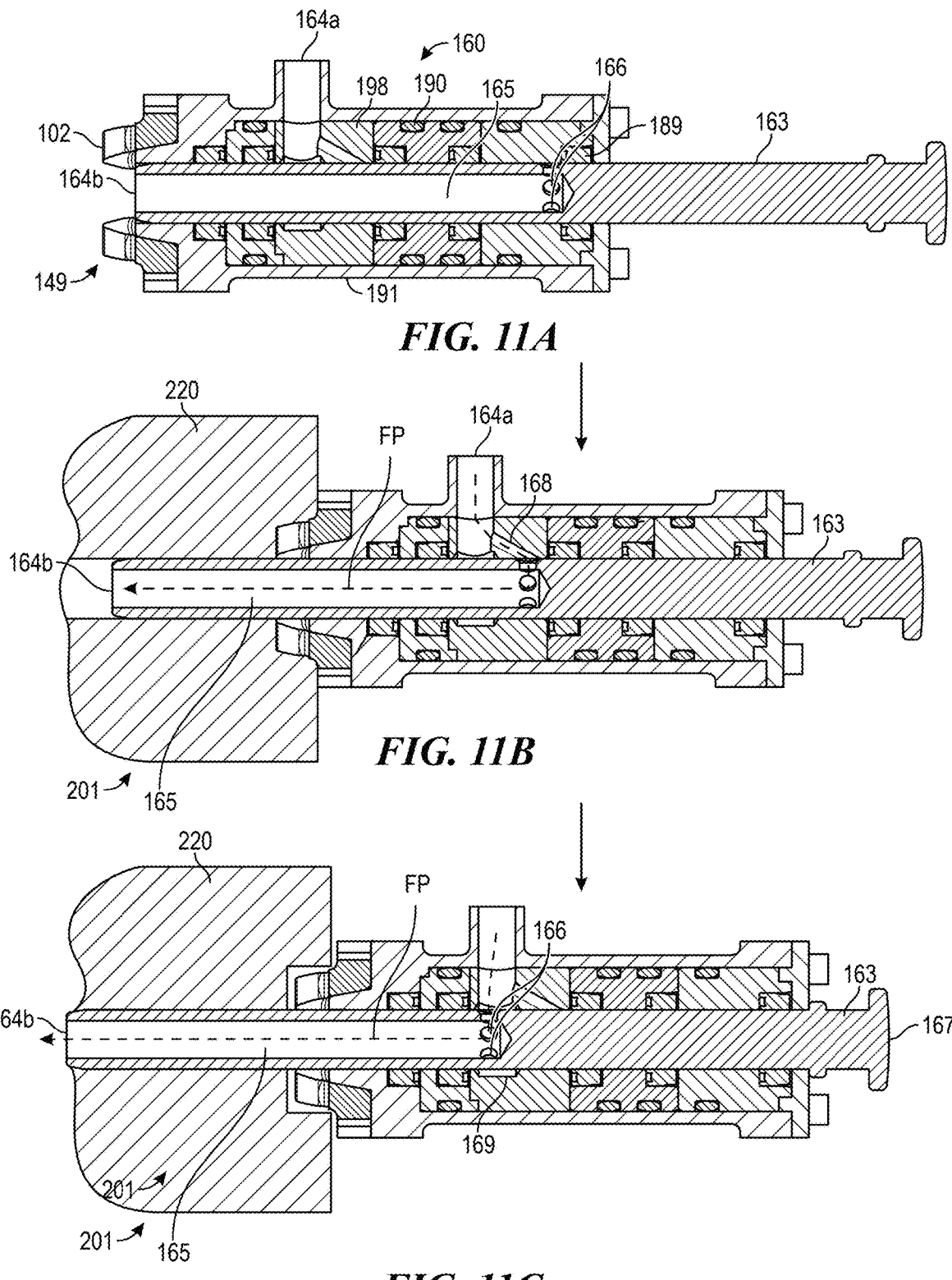
FIGS. 11A-11C are partially schematic, cross-sectional illustrations of an embodiment of the valve device shown in FIG. 10.

FIGS. 11A-11C are cross-sectional illustrations of the first valve device 160 in three positions. FIG. 11A illustrates the first valve device 160 in its closed position. The probe 163 includes valve apertures 166 that, when the valve is opened, provide for fluid communication between the first port 164*a* and the second port 164*b* via a flow channel 165. In the closed configuration shown in FIG. 11A, the valve apertures 166 do not provide such fluid communication. Also shown in FIG. 11A are a series of seals 189 that provide for fluid-tight connections between the probe 163 and one or more outwardly positioned seal supports 198. The seal supports 198 also carry one or more O-rings 190 that seal against the interior of the valve housing 191, to provide an overall fluid-tight arrangement.

FIG. 11B illustrates the first valve device 160 in a "check" configuration. In this configuration, the first valve device 160 is in contact with a corresponding second valve device 220 (a portion of which is shown schematically) of the second space vehicle 201. In particular, the probe 163 has moved (e.g., translated) so as to be partially inserted into the second valve device 220. In this position, (a) the pressures in the first and second valve devices 160, 220 can be equalized, and (b) the fluid is allowed to flow from the first port 164a to the second port 164b and into a portion of the second valve device 220—but the second valve device 220 is not fully opened. As a result, an operator (or an automated system) can check to see whether the appropriate coupling has been made between the first and second valve devices 160, 220, before fully opening the second valve device 220. In this configuration, the valve apertures 166 are aligned with a check slot 168 that also communicates with the first port 164a. In this configuration, a small amount of fluid can accordingly pass from the first port 164a, through the check slot 168 and the valve apertures 166, to the second port 164b, and partially through the second valve device 220, as indicated by flow path arrow FP. The amount of fluid is minimal, thereby allowing the operator to check the continuity of the connection, without inadvertently losing a large amount of fluid in the event the valve devices are not properly coupled.

In FIG. 11C, the plunger 163 has moved to its fully open position. In this position, the valve apertures 166 are all aligned with a fluid coupling chamber 169 that circumferentially surrounds the valve apertures 166, and is in fluid communication with the first fluid port 164a. In this configuration, fluid can freely flow between the two ports 164a, 164b, as indicated by flow path arrow FP. In this position, the plunger 163 has also fully opened the corresponding valve on the second space vehicle, to allow a full flow out of the second fluid port 164b. By contrast, in the check configuration shown in FIG. 11B, only a small number of valve apertures 166 have fluid communication with the corresponding check slot 168, and the second valve device 220 is not fully opened.

As is further shown in FIG. 11C, the probe 163 can include a contact surface 167 which is driven by the drive assembly 186 (shown in FIG. 9), and described further below with reference to FIG. 12. In a particular embodiment, the contact surface 167 has a very gently curved (i.e., large radius) spherical surface, to account for any misalignments between the probe 163 and the corresponding drive mechanism.

Figure 12:
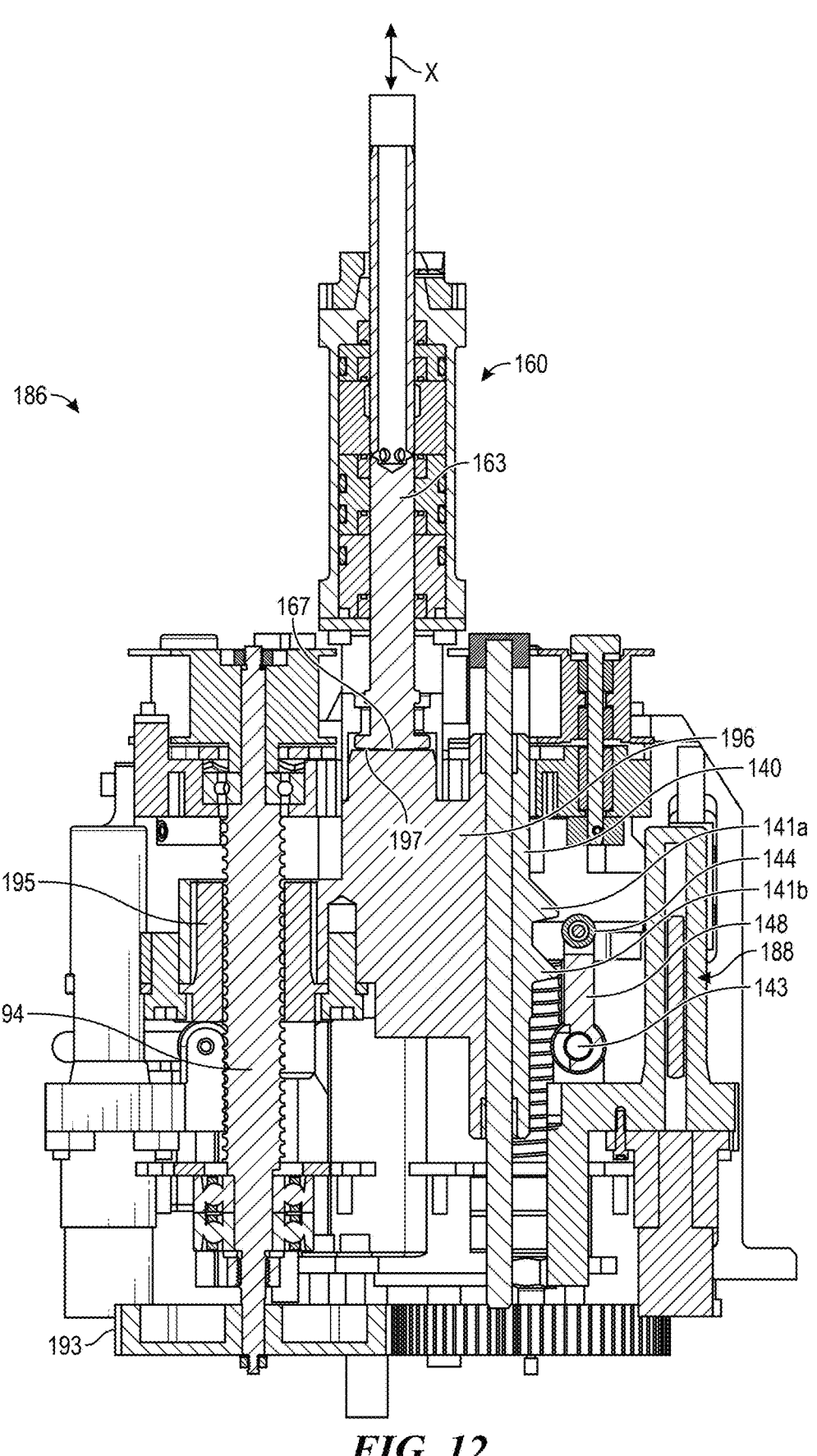
FIG. 12 is a partially schematic, cross-sectional illustration of a valve device and driver arrangement for opening and closing the valve device, configured in accordance with embodiments of the present technology.

FIG. 12 is a partially schematic, cross-sectional illustration of one of the first valve devices 160 coupled to the valve drive assembly 186. The valve drive assembly 186 drives the probe 163 back and forth as indicated by arrow X to open and close the first valve device 160. The illustrated valve drive assembly 186 is configured to operate two first valve devices 160, but for purposes of discussion below, only one of the first valve devices 160 is described in detail.

The valve drive assembly 186 includes the screw 194 described above, which is motor-driven via the intermediate gear 193. The screw 194 is threadably engaged with the corresponding nut 195 that is in turn connected to a probe driver 196. Accordingly, when the intermediate gear 193 rotates, it rotates the screw 194, which translates the nut 195 and therefore the probe driver 196 axially as indicated by arrow X. The probe driver 196 includes a driver contact surface 197 that engages with the corresponding probe contact surface 167 carried by the probe 163 and described above with reference to FIG. 11C. As was also described above, the probe contact surface 167 can have a very large radius spherical surface, so as to account for minor misalignments between the probe driver 196 and the probe 163, and to avoid misaligning the drive forces between these two elements.

The probe driver 196 carries a rack 140 having one or more ratchet teeth, two of which are shown in FIG. 12 as first and second ratchet teeth 141a, 141b. The ratchet teeth can be engaged with the locking device 188 to avoid relying on the drive motor 187 (FIG. 9) to maintain the first valve device 160 in the desired position. In particular, when the probe driver 196 has driven the probe 163 to the valve check position, the locking device 188 can engage with the first ratchet tooth 141a. When the probe 163 is driven to the open position, the valve locking device 188 can engage with the second ratchet tooth 141b of the rack 140. In both cases, the locking device 188 prevents the probe driver 196 from inadvertently retracting. In this manner, (a) the motor does not need to continually supply current to keep the probe driver 196 in the illustrated position, and (b) if the motor fails, the valve will remain in its open position.

As discussed above with reference to FIG. 9, the locking device 188 can include a locking arm 142 that pivots about a pivot joint 143, and carries the lock element 144. When the lock element 144 is engaged with the ratchet tooth or teeth 141, the probe driver 196 is locked in position. When the lock element 144 is disengaged from the ratchet teeth, the probe driver 196 is free to move between open and closed positions.

Figures 13A, 13B:
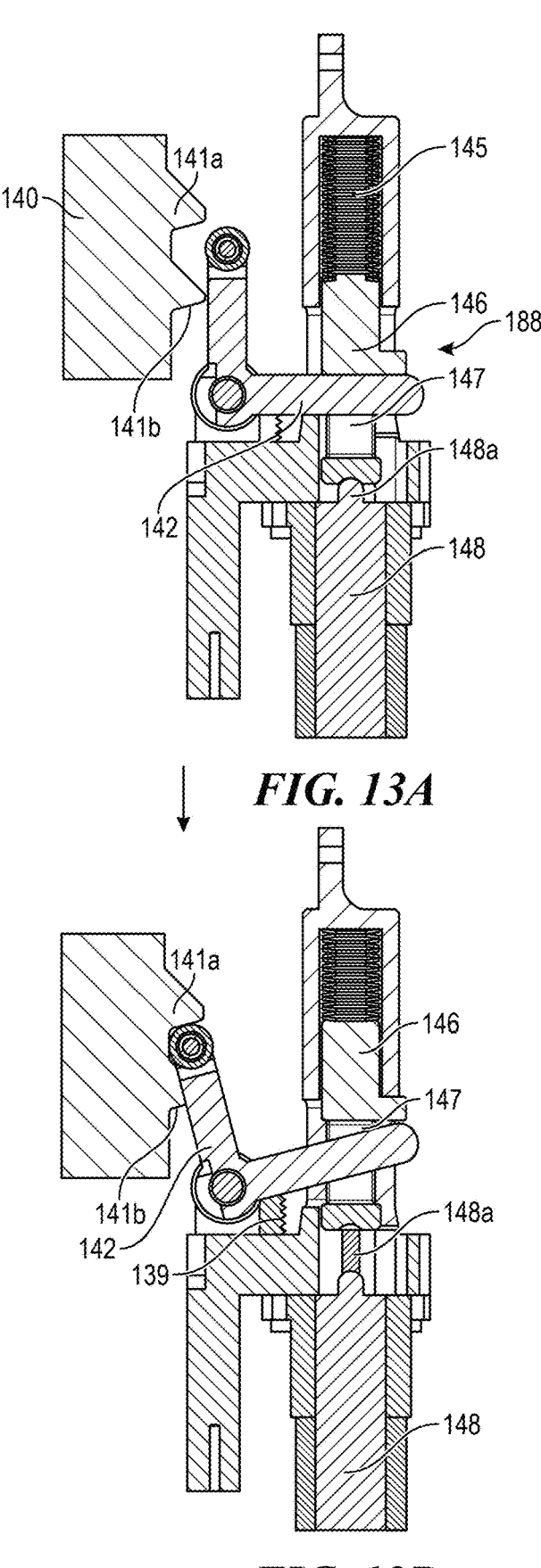
FIGS. 13A and 13B illustrate an arrangement for locking a valve drive device in an open position, in accordance with embodiments of the present technology.

FIGS. 13A and 13B illustrate the locking device 188 in the unlocked position (FIG. 13A) and the locked position (FIG. 13B). Beginning with FIG. 13A, the locking arm 142 includes a lateral portion that extends into a slot 147 of a corresponding arm retainer 146. The arm retainer 146 is biased downwardly by a spring or series of washers 145. Accordingly, the downward force of the arm retainer 146 on the locking arm 142 prevents the lock element 144 from rotating into the rack 140.

The arm retainer 146 is engaged with an actuator 148 (e.g., a wax motor and/or other suitable device) that, for example, drives a piston 148a. When actuated, the actuator 148 extends the piston 148a, which moves the arm retainer 146 upwardly, against the force of the spring 145, as shown in FIG. 13B. This motion in turn allows the locking arm 142 to rotate so that the lock element 144 engages with the rack 140. A biasing spring 139 biases the now-released locking arm 142 toward the rack 140 and into engagement with one of the teeth 141a, 141b. In this position, the rack 140 (and therefore the corresponding probe driver 196 and probe 163 described above with reference to FIG. 12) are locked in position.

Figure 14:
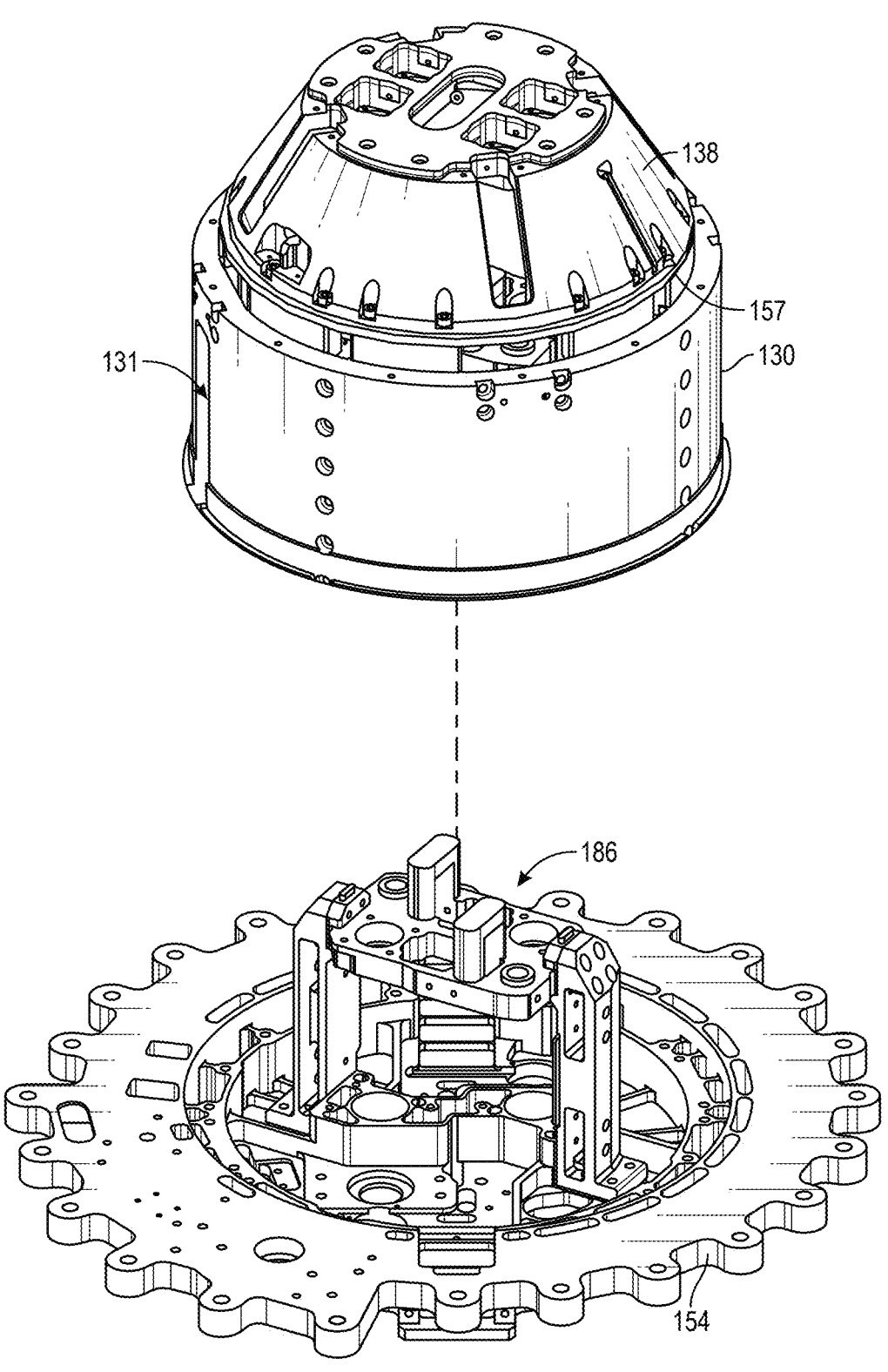
FIG. 14 is a partially schematic, exploded illustration of a valve drive assembly positioned on a mounting flange, with a housing positioned to secure the device in accordance with embodiments of the present technology.
Figure 15:
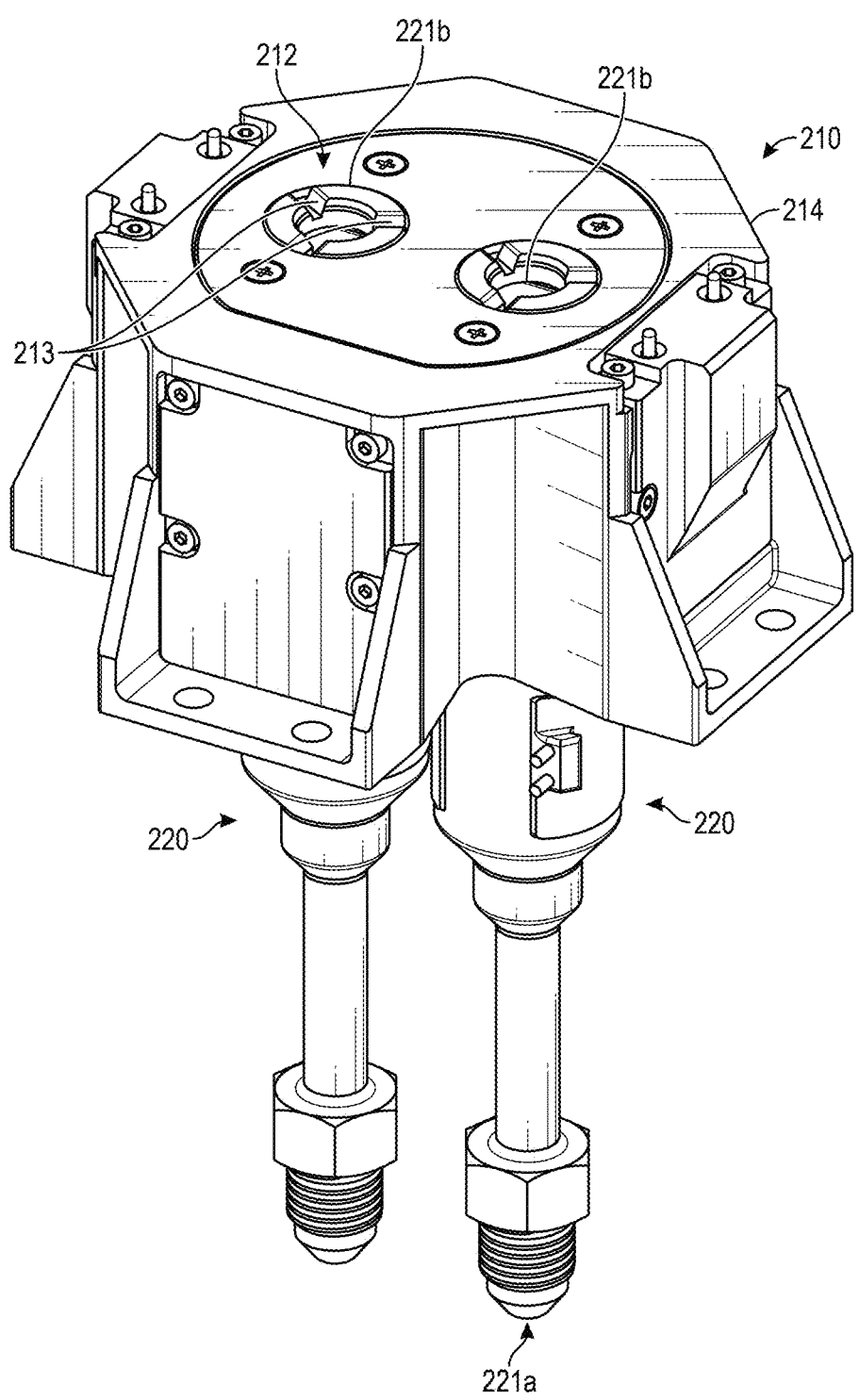
FIG. 15 is a partially schematic, isometric illustration of a second coupler, configured to be carried by a second spacecraft, and configured to mate with a first coupler carried by a first spacecraft in accordance with embodiments of the present technology.

FIG. 14 illustrates a partially exploded view of the valve drive assembly 186 described above carried by the attachment flange 154. The valve drive assembly 186 fits radially inwardly from the latch arm carrier 157, and the structure tube 130. FIG. 14 also illustrates an upper structure 138, which is positioned over the valve drive assembly 186, and includes appropriate slots for the latch arms, valve devices, and contact plungers. Further access openings include the support tube slot 131, which allows the cam follower 158 (not shown in FIG. 14) to extend outwardly and engage with the cam tube 170 (also not shown in FIG. 14).

D. Valve Operation-Second Vehicle

The mechanisms for coupling two space vehicles together, and for opening and closing the valve of the first space vehicle, have now been described. The following description relates to the valve of the second space vehicle. Beginning with FIG. 15, the second coupler 210, carried by the second space vehicle described above with reference to FIG. 1, can include a housing 214 carrying one or more second valve devices 220. In an embodiment shown in FIG. 15, the housing 214 carries two second valve devices 220, corresponding to the two first valve devices carried by the first space vehicle. Each second valve device 220 can include a first port 221a and a second port 221b that are in fluid communication when the second valve device is open, and are isolated from fluid communication with each other when the second valve device is closed. The second coupler 210 can also include second alignment features 212 that are positioned and configured to mate with the first alignment features 149 carried by the first coupler 150 and described above with reference to FIGS. 9-11A. In this particular embodiment, the second alignment features 212 can include recesses 213 that have a canoe sphere shape to receive the correspondingly-shaped tabs of the first alignment features described above.

Figure 16:
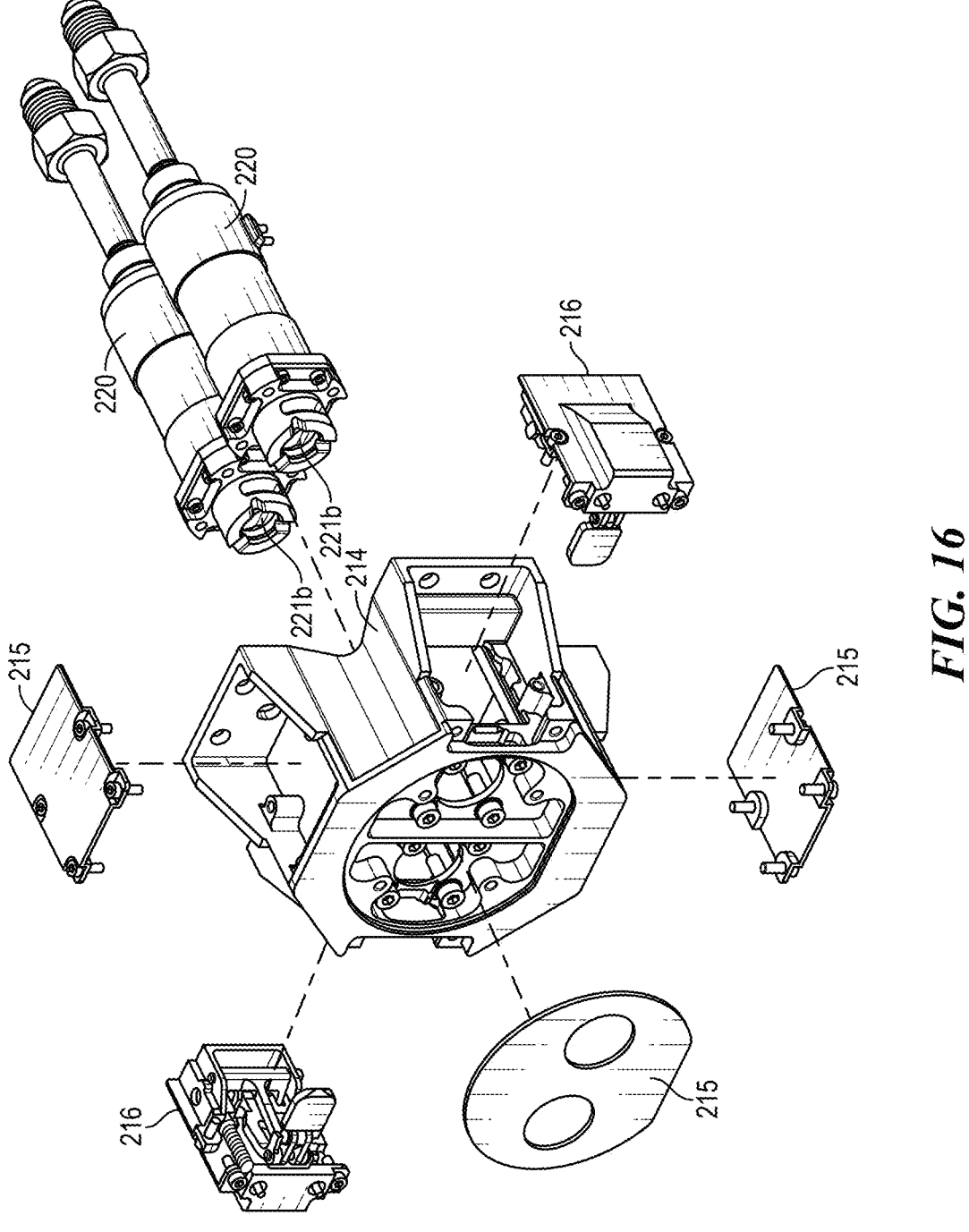
FIG. 16 is a partially schematic, partially exploded illustration of the second coupler shown in FIG. 15.

FIG. 16 is a partially exploded illustration of the two second valve devices 220, illustrating the housing 214 and corresponding housing covers 215. The housing 214 also carries two valve cover devices 216, each of which is configured to cover the corresponding second ports 221b of the corresponding second valve devices 220 until the valves are ready to receive fluid from the first space vehicle.

Figure 17A:
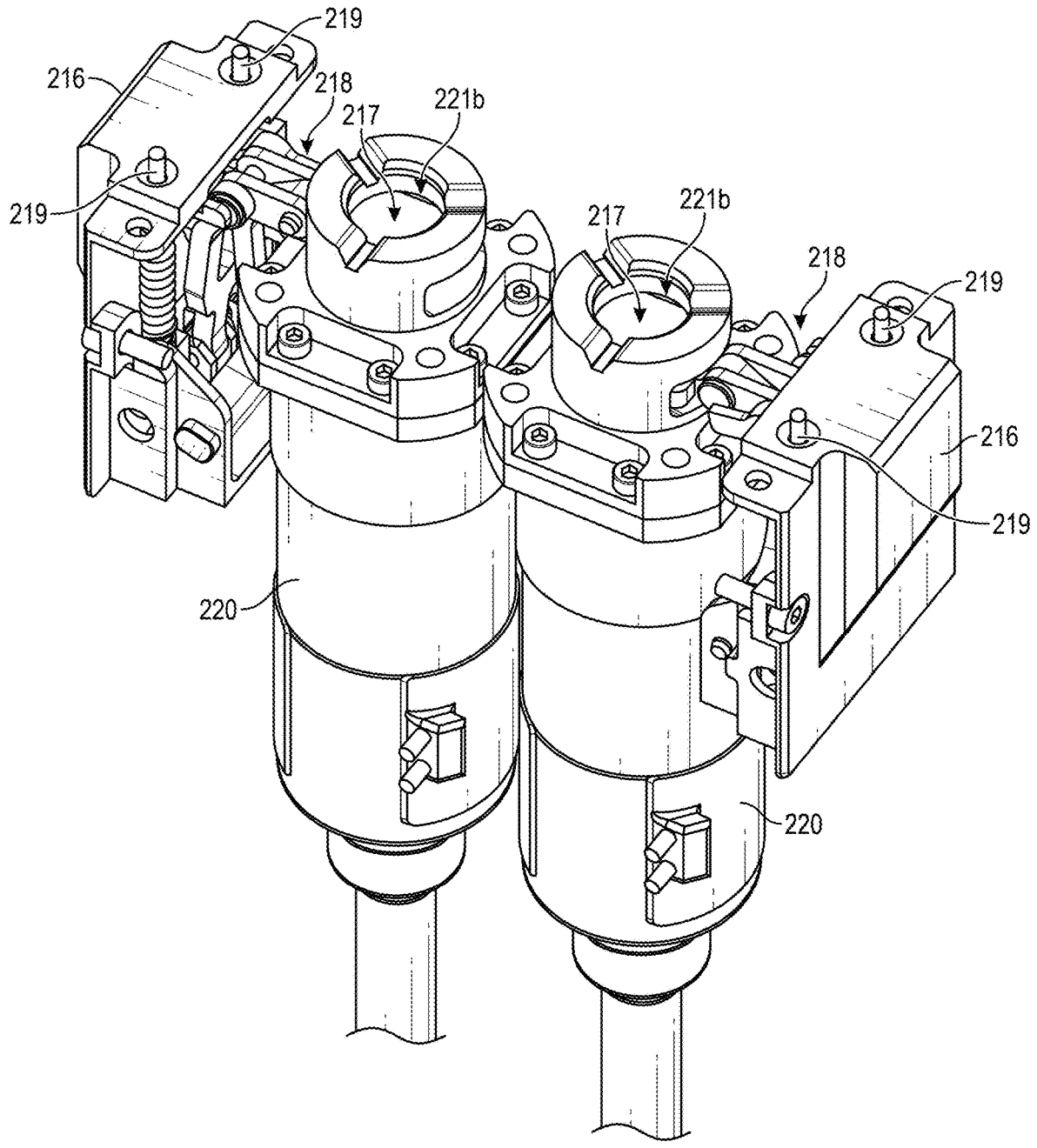
FIG. 17A illustrates a representative second valve device with valve covers in a closed position, in accordance with embodiments of the present technology.
Figure 17B:
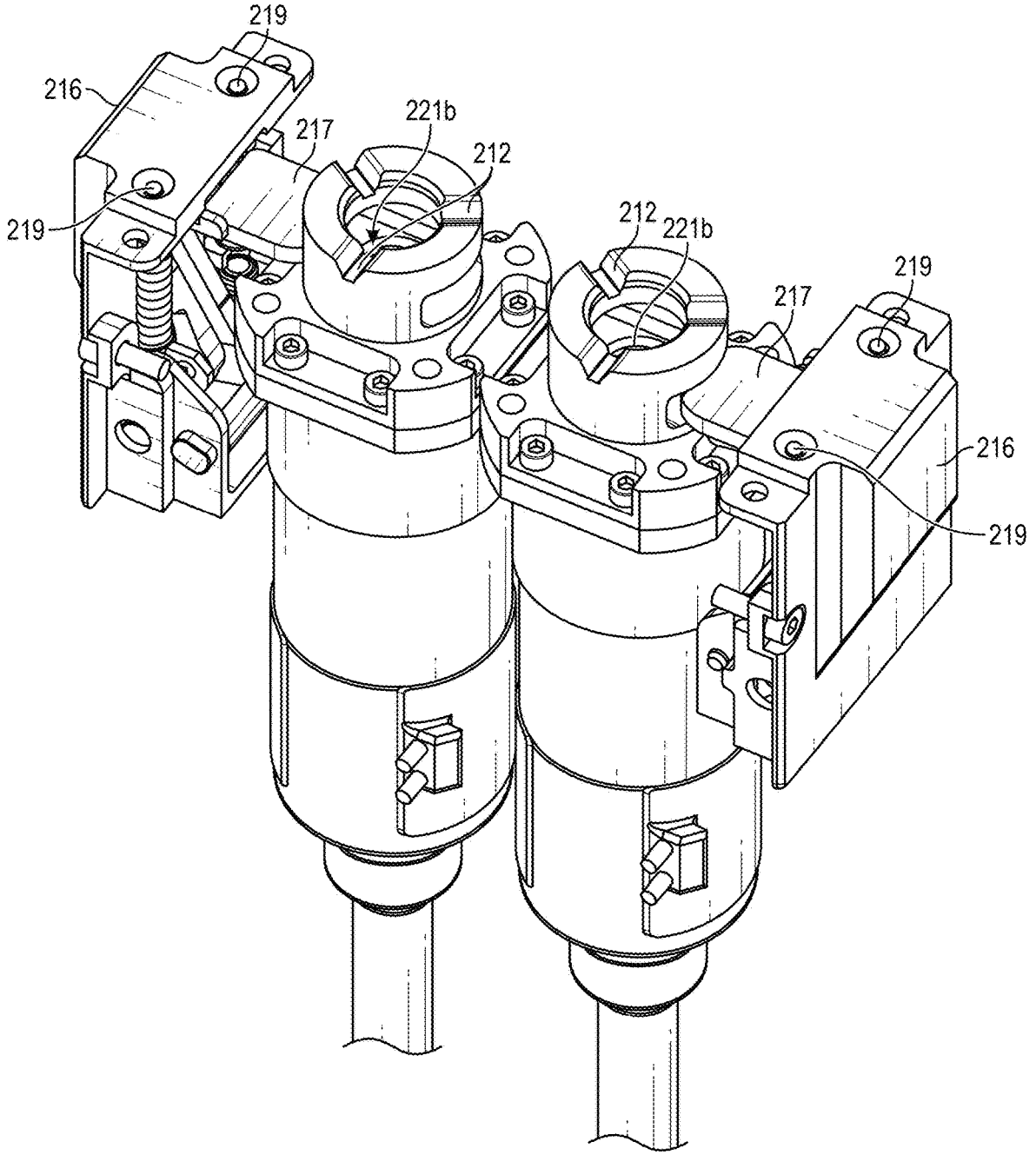
FIG. 17B illustrates the representative second valve device with valve covers shown in an open position, in accordance with embodiments of the present technology.

FIG. 17A is an enlarged illustration of the assembled second valve devices 220, and the corresponding valve cover devices 216. Each of the valve cover devices 216 can carry one or more contact elements 219 (two of which are shown in FIG. 17A). When the contact elements 219 are engaged and depressed (as shown in FIG. 17A) due to contact with the first space vehicle, the valve covers 217 (which are shown in a closed position in FIG. 17A) move to an open position, as shown in FIG. 17B. Accordingly, the contact elements 219 operate as an actuator 218 for the valve cover devices 216.

FIG. 17B illustrates the valve covers 217 in an open or retracted position, resulting from the contact elements 219 being depressed. In this position, the valve covers 217 are retracted away from the corresponding second ports 221b, allowing for fluid communication through these ports. The contact elements 219 can be depressed as part of the same motion that engages the second alignment features 212 with the corresponding first alignment features of the first space vehicle, though these actions need not take place simultaneously.

Figures 18A, 18B, 18C:
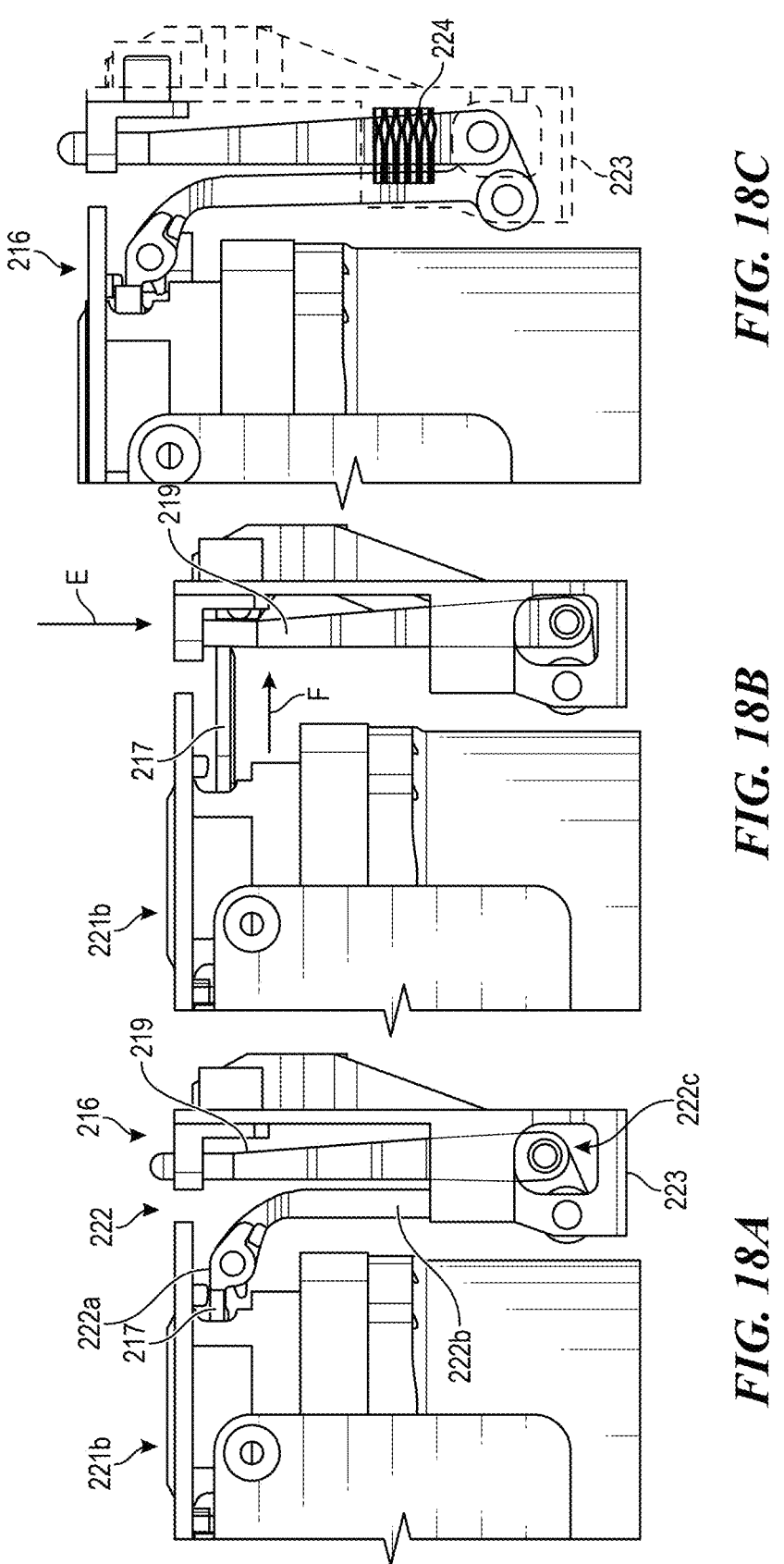
FIGS. 18A-18C illustrate a sequence for opening valve covers in accordance with embodiments of the present technology.
Figure 19:
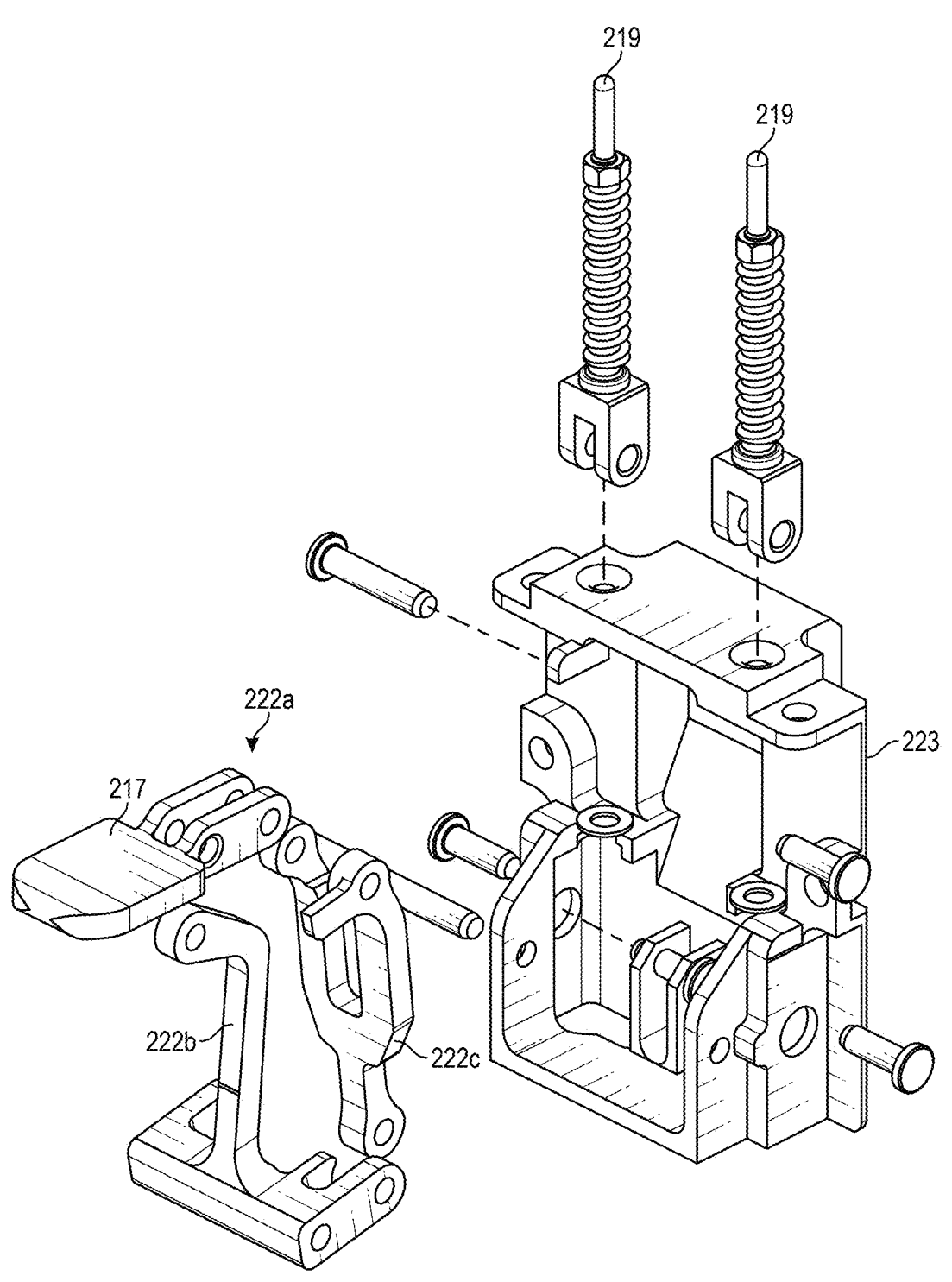
FIG. 19 is a partially exploded illustration of a valve cover device configured in accordance with embodiments of the present technology.

FIGS. 18A-18C illustrate further details of the operation of the valve cover 217. Beginning with FIG. 18A, the valve cover device 216 can include a linkage arrangement 222 (e.g., a four-bar linkage) that moves the valve cover 217 toward and away from the corresponding second port 221b. In a particular embodiment, the cover 217 operates as a first link 222a, and is pivotably connected to a second link 222b. The second link 222b is pivotably connected to a third link 222c, which is coupled to a corresponding bracket 223. The bracket 223 operates as the fourth link, and the linkage arrangement 222 is driven by the contact element 219. Accordingly, when the contact element 219 is driven downwardly, as indicated by arrow E in FIG. 18B, the valve cover 217 retracts to the right, as indicated by arrow F, to expose the second port 221b. FIG. 18C illustrates the valve cover 217 to its closed position, and also illustrates a closure spring 224 positioned within the bracket 223 and configured to bias the valve cover 217 to its closed (e.g., normally closed) position. FIG. 19 is a partially exploded illustration of the valve cover device components described above.

Figure 20:
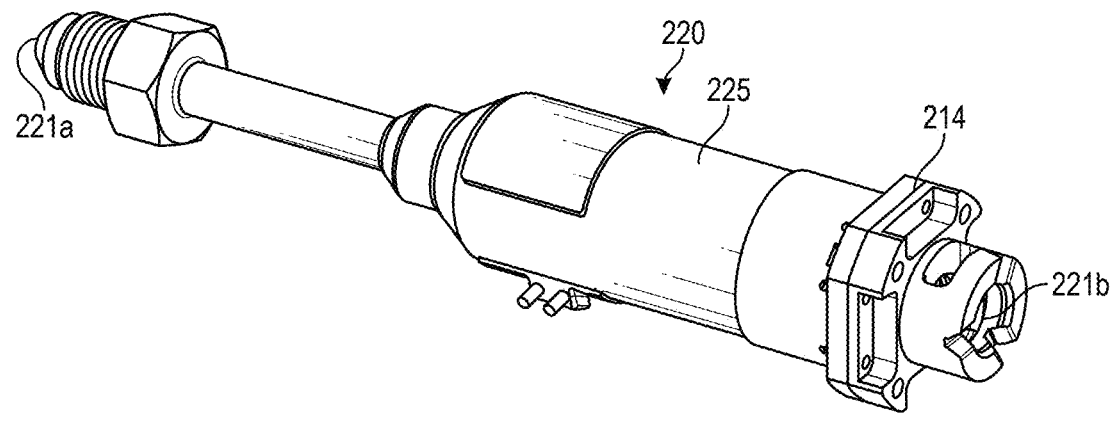
FIG. 20 is a partially schematic, isometric illustration of a second valve device configured in accordance with embodiments of the present technology.

FIG. 20 is a partially schematic, isometric view of the second valve device 220, illustrating the first port 221a, the second port 221b, the cover housing 214, and the corresponding valve housing 225.

Figure 21:
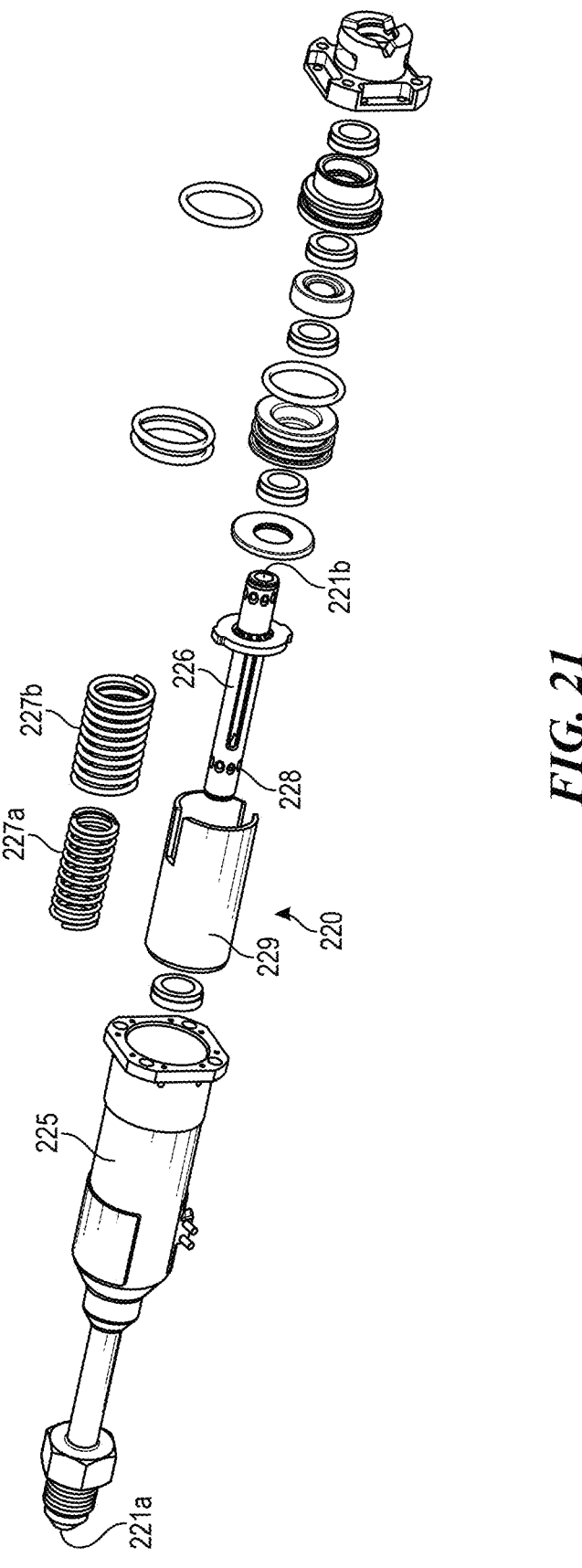
FIG. 21 is a partially exploded illustration of the second valve device shown in FIG. 20.

FIG. 21 is an exploded view of the second valve device 220 with the main components discussed below. FIG. 21 illustrates the valve housing 225, carrying the first port 221a. A valve element or pintle 226 reciprocates or moves axially (e.g., along a longitudinal axis) within the valve housing 225. The valve element 226 includes valve ports 228 that allow for fluid communication between the first port 221a and the second port 221b when the valve is open, and prevents such communication when the valve is closed. A seal retainer 229 supports one or more internal seals, and houses an inner spring 227a and an outer spring 227b. The inner and outer springs 227a, 227b provide redundant forces to bias the valve element 226 to its closed position and have opposite winding directions/orientations to avoid interfering with each other, which bias the valve elements in a manner described below.

E. Combined Valve Operation—First and Second Vehicles

Figure 22:
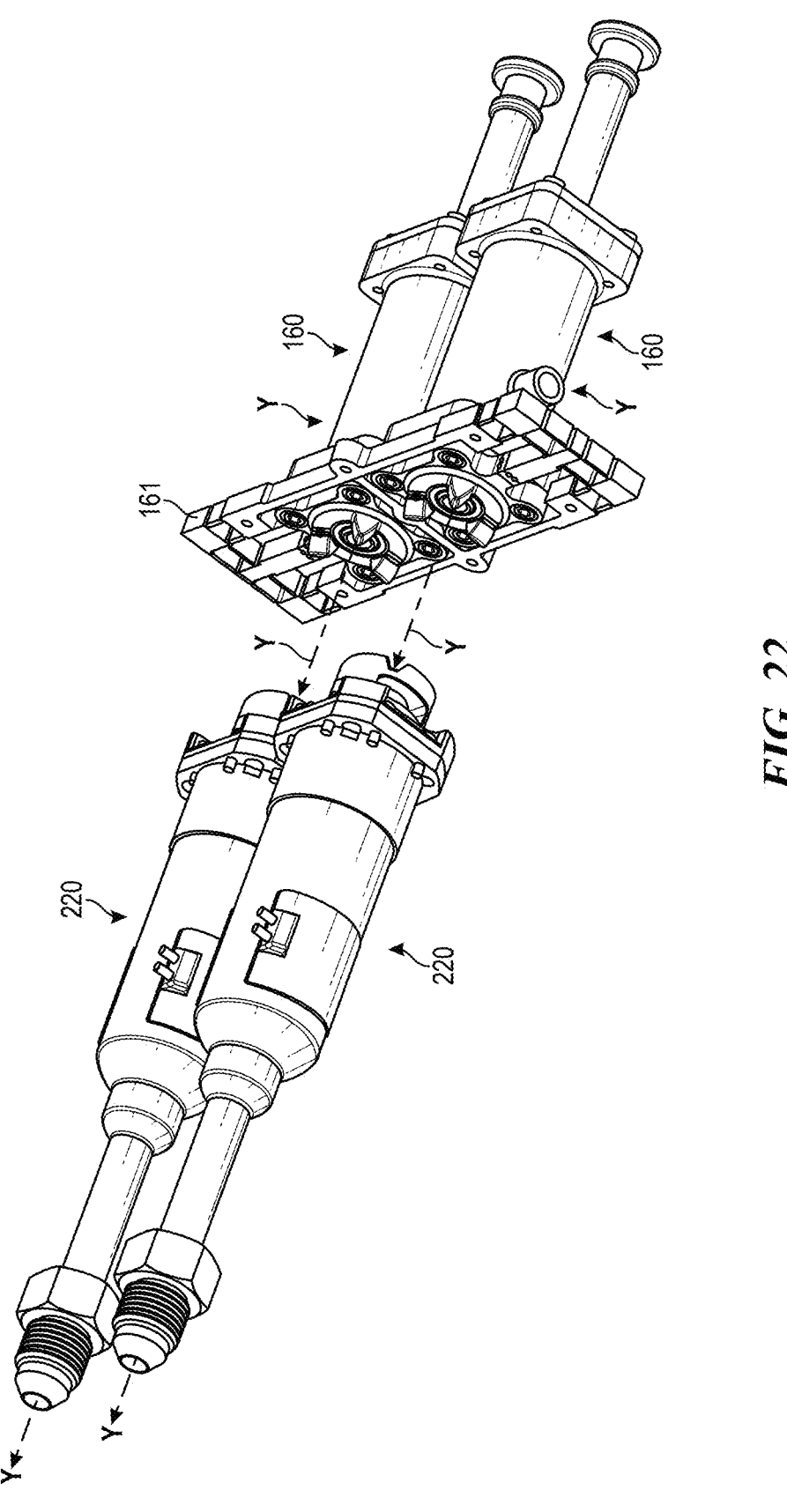
FIG. 22 is a partially schematic illustration of the first and second valve devices shown prior to mating.

FIG. 22 is an enlarged illustration of a pair of first valve devices 160 positioned to mate with corresponding second valve devices 220. Once mated, fluid can pass through the first valve device 160, and to and through the second valve device 220 (arrows Y), or vice versa. In some embodiments, the first and/or second valve devices 160, 220 can include features that allow for some degree of lateral flexure, to account for possible misalignments, but are stiffer in the axial direction. For example, the valve positioning bracket 161 carried by the first valve devices 160 can have such a configuration.

Figures 23A, 23B, 23C:
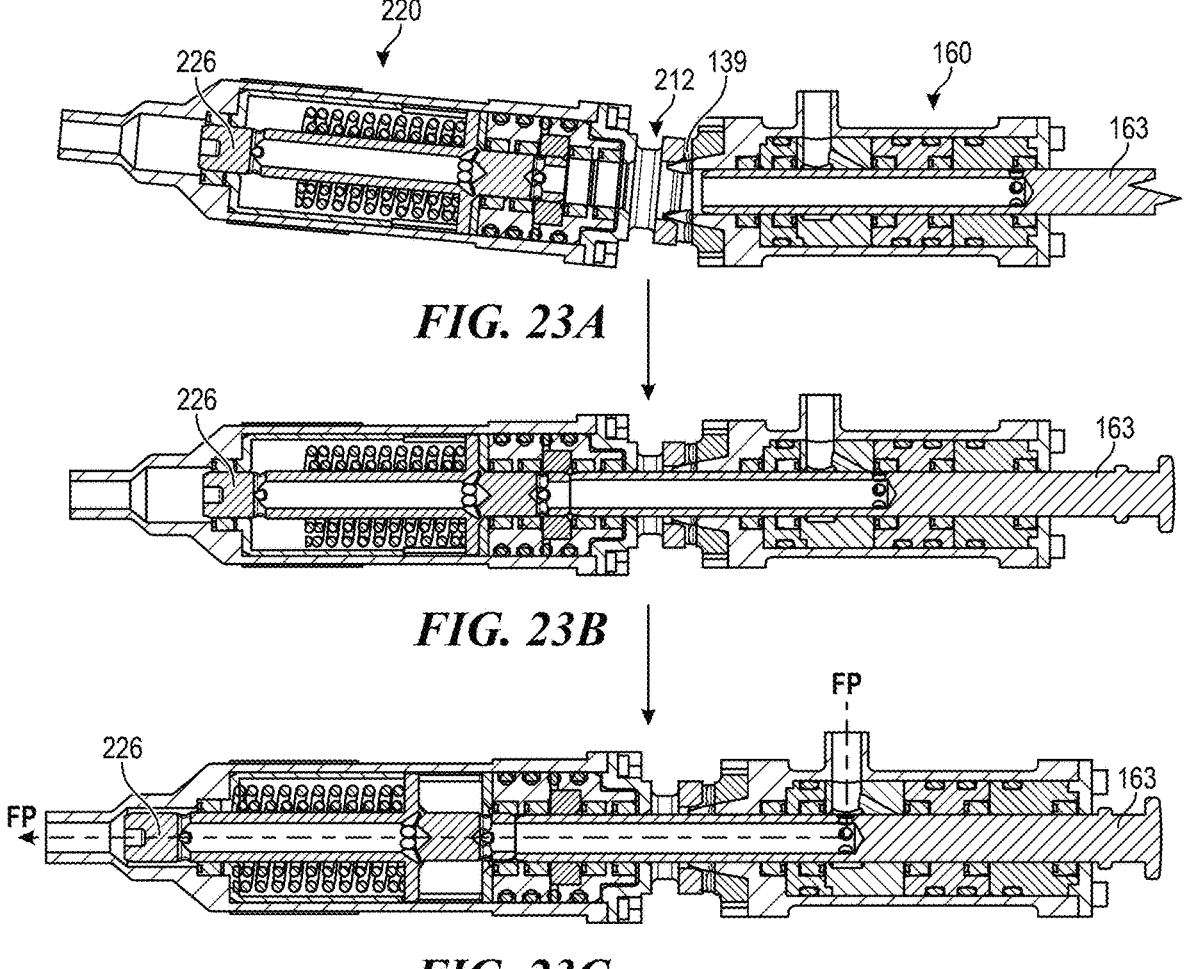
FIGS. 23A-23C illustrate a sequence for coupling a first valve device carried by a first space vehicle with a second valve device carried by a second space vehicle, in accordance with embodiments of the present technology.

FIGS. 23A-23C illustrate a representative process by which the first valve device 160 carried by the first space vehicle engages with the second valve device 220 carried by the second space vehicle, and an operation by which both valve devices open to allow fluid communication between the two space vehicles. Beginning with FIG. 23A, as the couplers carried by each space vehicle are engaged with each other, the first alignment features 139 carried by the first valve device 160 engage with the second alignment features 212 carried by the second valve device 220. Once the alignment features 139, 212 are engaged, the probe 163 carried by the first valve device 160 begins advancing from right to left, as shown in FIG. 23B. The motion of the probe 163 pauses at the check position (shown in FIG. 23B) to allow the operator and/or automated system to check for fluid leaks before the second valve device 220 is fully opened to allow fluid communication between the two space vehicles. Once the check has been passed, the probe 163 continues driving to the left, as shown in FIG. 23C, to open the second valve device 220, allowing for fluid communication between the two valve devices along the flow path FP, which can be bi-directional. Each valve device 160, 220 is coupled to a fluid container (e.g., a fluid source and/or a fluid sink), carried by the corresponding space vehicle, to contain the transferred fluid.

Figure 24:
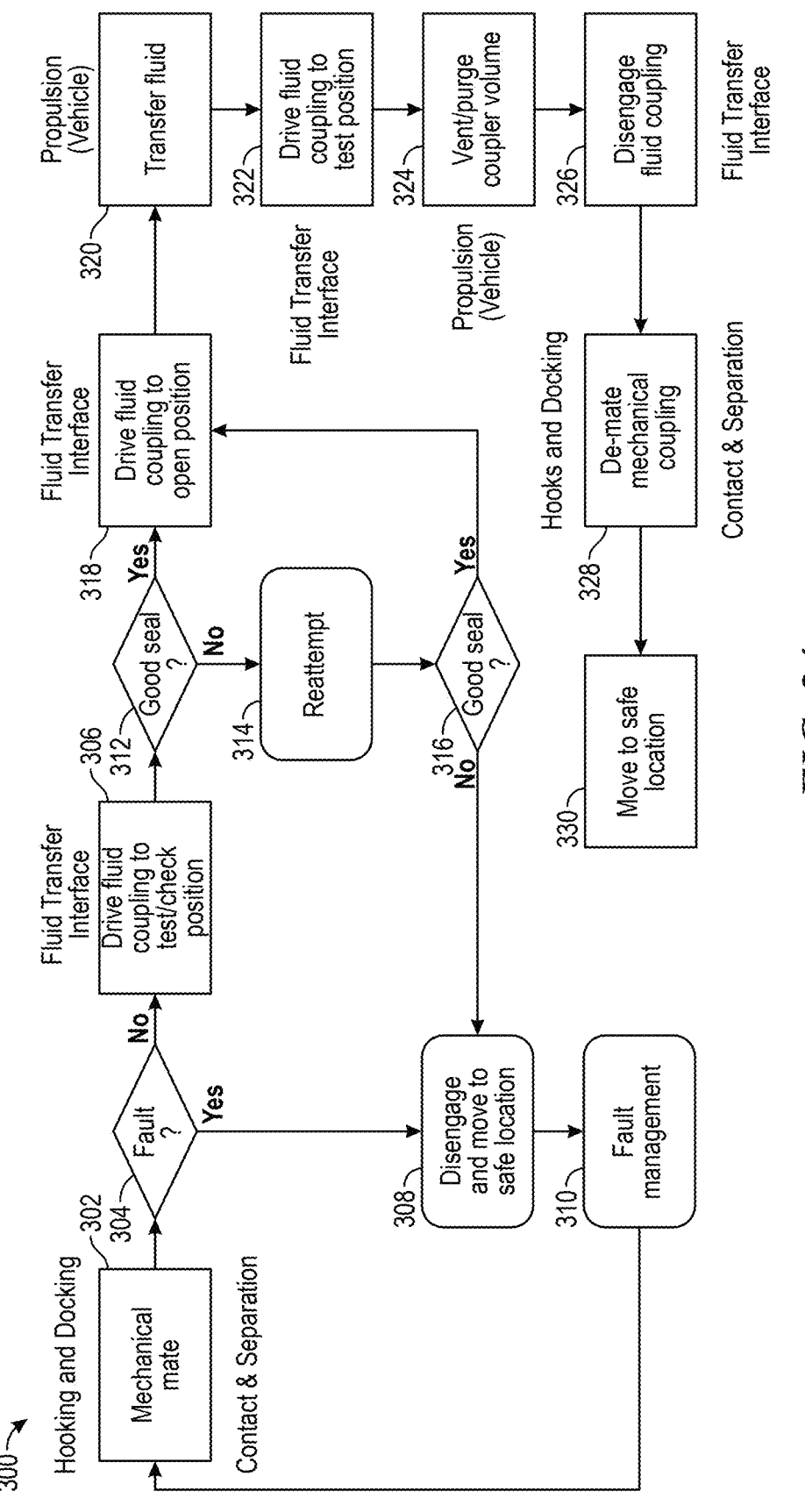
FIG. 24 is a flow diagram illustrating a process for coupling and transferring material between two spacecraft, in accordance with embodiments of the present technology.

FIG. 24 is a flow diagram illustrating a representative process for coupling and transferring fluid between two space vehicles or spacecraft. The process 300 begins with block 302 in which a mechanical mate or coupling is completed and checked. At block 304, if a fault during the coupling process is detected, then the process moves to block 308 at which the two vehicles are disengaged and move to a safe location. At block 310, the fault is managed and corrected. The process then moves back to block 302 to re-mate/re-couple the space vehicles. If the fault has been corrected, the process moves to block 306 to operate the fluid transfer interface. The valves are engaged with each other and moved to a test or check position, for example, as indicated in FIG. 23B above. If the test demonstrates a good seal, the process continues to block 318. If not, the seal is re-attempted at block 314 and re-checked at block 316. If a good seal is still not obtained, then the spacecraft can be disengaged, moved to a safe location, and the process can be restarted.

Proceeding from block 318, once the valves have been suitably aligned and checked, the fluid is transferred at block 320. This may include the participation of the propulsion system of the second space vehicle, e.g., to properly receive propellant.

At block 322, the valves are moved to the test/check position, in which the valves are sealed externally, but can be internally cleared. This process reduces or eliminates the chances for the transferred fluid to drip onto either one of the space vehicles, which can occlude optically-sensitive surfaces, and/or otherwise cause damage to the vehicle. In addition, this operation can clear the valves so that fluid does not remain in either of the valves, thereby avoiding later opportunities for residual fluids to leak from the valves.

At block 324, the elements are vented or purged, as discussed above, and at block 326, the couplings are disengaged from each other; that is, the valves are closed. At block 328, the mechanical coupling between the two vehicles is decoupled or de-mated. This process can include the plungers pushing or accelerating the two vehicles apart from each other. At block 330, the space vehicles are moved to a safe location, and from that point, each space vehicle carries out its next mission.

Some or all of the foregoing processes can be completed automatically, or semi-automatically, for example, via the controllers described above with reference to FIG. 1. In some embodiments, the entire process can be automated, and in other embodiments, human operators can oversee and/or control one or more of the foregoing processes, and can interrupt the processes in the event the automated system produces undesired actions.

In any of the foregoing embodiments, once the two space vehicles are coupled, fluids can be transferred (as discussed above), but also other data or information can be transferred while the vehicles are coupled. For example, the interface devices can include electrical interfaces, to allow rapid transfer of data from one vehicle to the other. In other embodiments, other suitable connections can also be made. For example, in addition to data, electrical power can be transmitted via corresponding interface elements carried by each space vehicle.

F. Conclusion

Further details of embodiments relating to the present technology are included in US Patent Application Publication No. 2021/0300602, filed on Mar. 24, 2021, and incorporated herein by reference. To the extent any materials incorporated herein by reference conflict with the present disclosure, the present disclosure controls.

From the foregoing, it will be appreciated that some embodiments of the present technology have been described herein for purposes of illustration, but various modifications can be made without deviating from the disclosed technology. For example, several of the actuators described above can have configurations different than those expressly described. The transferred fluids can be liquids and/or gases, can include fluids other than propellants, and/or can be transferred in either direction between the vehicles. In some embodiments, one or more surfaces of elements of the technology can include conductive surfaces or coatings to resist accumulation of a static charge.

Further, while advantages associated with some embodiments of the technology have been described in the context of those embodiments, some embodiments may also exhibit said advantages, and not all embodiments need necessarily exhibit such advantages to fall within the scope of the present technology. Accordingly, the present disclosure and associated technology can encompass other embodiments not expressly described or shown herein.

As used herein, the term "and/or" when used in the phrase "A and/or B" means "A, or B, or both A and B." A similar manner of interpretation applies to the term "and/or" when used in a list of more than two terms. As used herein, the terms "about" and "approximately" refer to values within 10% of the stated value.

The following Examples include additional embodiments of the present technology:

EXAMPLES

1. A fluid transfer system for space vehicles, comprising:
a first coupler configured to be carried by a first space vehicle;
a first valve device carried by the first coupler;
a second coupler configured to be carried by a second space vehicle; and
a second valve device carried by the second coupler; and wherein:
    the first coupler includes rotatable and translatable latch arms positioned to engage with and connect to the second coupler;
    the first valve device incudes a moveable probe that is insertable into the second valve device when the latch arms of the first coupler are connected to the second coupler to transfer fluid between the first and second valve devices.

2. The system of example 1, further comprising a single motor coupled to all the rotatable and translatable latch arms, and wherein individual latch arms are coupled to both an elastic element and a fixedly movable element to move between a closed position and an open position.

3. The system of example 2 wherein the elastic element includes a latch arm spring positioned to bias the individual latch arm toward the closed position, and the fixedly movable element includes an at least approximately rigid latch arm guide positioned to releasably hold the individual latch arm in the closed position.

4. The system of any of examples 1-3 wherein the probe of the first valve device is movable among at least three positions: a closed position, a check position, and an open position.

5. The system of example 4 wherein, in the closed position, a fluid pathway through the first valve device is closed.

6. The system of example 4 wherein, in the open position, a fluid pathway through both the first and second valve devices is open.

7. The system of example 4 wherein, in the check position, a fluid pathway is open through the first valve device, but not through the second valve device.

8. The system of example 4 wherein the probe is translatable among the at least three positions.

9. The system of any of examples 1-8 wherein the latch arms are configured to fail to an open position.

10. The system of example 9, further comprising an actuator operably coupled to the latch arms to move the latch arms between the open and closed position, and a spring motor operably coupled to the latch arms to move the latch arms to the open position if the actuator fails.

11. The system of any of examples 1-10 wherein the latch arms are configured to fail to a closed position.

12. The system of example 11, further comprising an actuator operably coupled to the latch arms to move the latch arms between the open and closed position, and a spring motor operably coupled to the latch arms to move the latch arms to the closed position if the actuator fails.

13. The system of any of examples 1-12, further comprising:

a cam tube having a cam slot, the cam slot extending circumferentially around at least a portion of the cam tube, and extending at least partially axially along at least part of a length of the cam tube;

a latch arm carrier having a cam follower positioned in the cam slot, and wherein the latch arms are pivotably coupled to the latch arm carrier; and an actuator operably coupled to the cam tube to rotate the cam tube, and translate the latch am carrier.

14. The system of example 13, further comprising a cam tube lock positioned to move relative to the cam tube between an engaged position in which the cam tube is inhibited from rotating, and a disengaged position, in which the cam tube is rotatable by the actuator.

15. The system of example 14 wherein the cam tube carries a gear, and wherein the cam tube lock includes teeth positioned to engage the gear in the engaged position, and disengage from the gear in the disengaged position.

16. The system of example 13, further comprising a support tube positioned concentrically between the cam tube and the latch arm carrier.

17. The system of example 16, further comprising a latch arm guide carried by the support tube, the latch arm guide including a roller positioned to roll along a surface of the at least one of the latch arms as the at least one latch arm translates.

18. The system of example 17 wherein the at least one latch arm is pivotable, and where in the translational motion path of the latch arm against the latch arm guide rotates at least one latch arm.

19. The system of example 13 wherein the latch arm carrier includes:

a first element to which the cam follower is connected;

a second element to which the latch arms are connected; and a flexible, resilient third element positioned between the first and second elements to transmit loads between the first and second elements.

20. The system of any of examples 1-19 wherein:

the movable probe is moveable along a probe axis first valve device is caried by a positioning bracket;

the positioning bracket has a greater degree of flexibility transverse to the probe axis than along the probe axis.

21. The system of example 20 wherein the positioning bracket includes first alignment features, and wherein the second coupler includes corresponding second alignment features that are engagable with the first alignment features, and wherein the flexibility of the positioning bracket transverse to the probe axis misalignment between the first and second alignment features.

22. The system of example 21 wherein the first alignment features include tabs and the second alignment features include recesses.

23. The system of example 22 wherein the tabs and recesses are positioned to constrain six degrees of freedom at six corresponding points between the first coupler and the second coupler when the tabs and recesses are engaged.

24. The system of any of examples 1-23 wherein at least one of the first coupler or the second coupler includes a separator positioned to push the first and second couplers away from each other.

25. The system of example 24 wherein the separator incudes a plunger coupled to a spring, and wherein the spring is positioned to store energy when the first and second couplers are latched by the latch arms, and release energy when the latch arms are disengaged.

26. The system of example 24 wherein the separator increases the amount of time in which the second coupler is within a grasping range of the latch arms.

27. A method for transferring fluid between two space vehicles, comprising:

coupling the first and second space vehicles by latching the first vehicle to the second vehicle, wherein latching includes rotating and translating a plurality of latch arms carried by the first space vehicle to draw the second space vehicle toward the first space vehicle;

inserting a movable probe carried by a first valve device of the first vehicle into a second valve device carried by the second space vehicle; and transferring fluid between the first and second space vehicles via the first and second valve devices.

28. The method of example 27 wherein coupling the first and second space vehicles includes, for each latch arm, moving the latch arm under the force of both an elastic element and a fixedly movable element.

29. The method of example 28 wherein the elastic element includes a spring, and the fixedly movable element includes an at least approximately rigid latch arm guide, and wherein coupling includes biasing the spring toward a closed position of the latch arm, and moving the rigid latch arm guide against the latch arm to hold the latch arm in the closed position.

30. The method of any of examples 27-29 wherein inserting the moveable probe includes:

moving the insertable probe from a closed position to an intermediate position;

checking for leaks along a flow path through the first valve device but not through the entire second valve device while the probe is in the intermediate position;

moving the insertable probe from the intermediate position to an open position; and transferring fluid between the first and second space vehicles through the first and second valve devices while the probe is in the open position.

31. The method of any of examples 27-30 wherein the latch arms are movable, via an actuator, between an open position and a closed position, and wherein the method further comprises driving the latch arms to the open position if the actuator fails.

32. The method of any of examples 27-31 wherein the latch arms are movable, via an actuator, between an open position and a closed position, and wherein the method further comprises driving the latch arms to the closed position if the actuator fails.

33. The method of any of examples 27-32 wherein the latch arms are carried by a latch arm carrier having a cam follower, and wherein translating the latch arms includes rotating a cam tube having a cam slot within which the cam follower is engaged.

34. The method of example 33 wherein individual latch arms bear against corresponding latch arm guides, and wherein rotating the latch arms includes moving the latch arms relative to the latch arm guides as the latch arms translate.

35. The method of any of examples 27-34, further comprising aligning the first and second space vehicles with tabs carried by the first vehicle and recesses carried by the second space vehicle, and wherein positions of the tabs are more constrained in a first direction than a second direction, the first direction being aligned with the translational motion of the latch arms, the second axis being transverse to the first axis.

36. The method of any of examples 27-34, further comprising:

storing energy produced by motion of the first and second space vehicles toward each other as the space vehicles coupled and before transferring the fluid; and releasing at least a portion of the stored energy to move the space vehicles apart from each other after transferring the fluid.

We claim:

1. A fluid transfer system for space vehicles, the system comprising a first coupler and a first valve device carried by the first coupler, wherein the first coupler is configured to be carried by a first space vehicle, wherein the first coupler comprises a cam tube, a latch arm carrier, and latch arms, and wherein:

the cam tube includes a cam slot;

the latch arm carrier comprises a cam follower positioned in the cam slot;

the latch arm carrier is translatable relative to the cam tube via relative motion between the cam follower and the cam slot; and the latch arms are pivotably connected to the latch arm carrier and moveable to engage a second coupler carried by a second space vehicle, wherein, when the latch arms are engaged with the second coupler, the first valve device is engageable with a second valve device associated with the second space vehicle to transfer fluid between the first space vehicle and the second space vehicle.

2. The system of claim 1, further comprising a single motor coupled to all the latch arms.

3. The system of claim 2, further comprising:

a latch arm spring positioned to bias an individual latch arm toward a closed position; and a latch arm guide positioned to releasably hold the individual latch arm in the closed position.

4. The system of claim 1 wherein the first valve device incudes a moveable probe that is insertable into the second valve device when the latch arms of the first coupler are connected to the second coupler.

5. The system of claim 4 wherein:

the probe of the first valve device is movable among at least three positions including a closed position, a check position and an open position;

in the closed position, a fluid pathway through the first valve device is closed;

in the open position, a fluid pathway through both the first and second valve devices is open; and in the check position, a fluid pathway is open through the first valve device, but not through the second valve device.

6. The system of claim 1, further comprising an actuator operably coupled to the latch arms to move the latch arms between an open position and closed position, and a spring motor operably coupled to the latch arms to move the latch arms to either the open position or the closed position if the actuator fails.

7. The system of claim 1, wherein:

the cam slot extends circumferentially around at least a portion of the cam tube, and extends at least partially axially along at least part of a length of the cam tube; and the system further comprises an actuator operably coupled to the cam tube to rotate the cam tube.

8. The system of claim 1, further comprising:

a support tube positioned concentrically between the cam tube and the latch arm carrier; and a latch arm guide carried by the support tube;

wherein when the latch arm carrier moves, the latch arm guide causes at least one of the latch arms to pivot.

9. The system of claim 1 wherein at least one of the first coupler or the second coupler includes a separator positioned to push the first and second couplers away from each other.

10. A fluid transfer system for space vehicles, the system comprising a first coupler and a first valve device carried by the first coupler, wherein the first coupler is configured to be carried by a first space vehicle, and wherein:

the first coupler comprises a tube, a latch arm carrier, latch arms carried by the latch arm carrier, and a latch arm guide;

the latch arms are movable and positionable to engage a second coupler carried by a second space vehicle, wherein when the latch arms are engaged with the second coupler, the first valve device is engageable with a second valve device associated with the second space vehicle to transfer fluid between the first space vehicle and the second space vehicle;

the latch arm carrier is translatable relative to the tube and relative to the latch arm guide;

at least one of the latch arms contacts the latch arm guide; and translation of the latch arm carrier causes the at least one of the latch arms to move relative to the latch arm guide, and contact between the at least one of the latch arms and the latch arm guide while the at least one of the latch arms moves relative to the latch arm guide causes the at least one of the latch arms to pivot.

11. The fluid transfer system of claim 10 wherein the first valve device incudes a moveable probe that is insertable into the second valve device when the latch arms of the first coupler are connected to the second coupler.

12. The fluid transfer system of claim 10 wherein the latch arm carrier is positioned within the tube.

13. The fluid transfer system of claim 10 wherein the tube is cam tube having a cam slot, the latch arm carrier has a cam follower, the cam follower is positionable in the cam slot, and rotation of the tube relative to the latch arm carrier causes the latch arm carrier to translate relative to the tube.

14. The fluid transfer system of claim 13, further comprising a support tube positioned concentrically between the cam tube and the latch arm carrier, wherein the support tube carries the latch arm guide.

15. The fluid transfer system of claim 13, wherein the latch arm guide comprises a roller configured to roll along a surface of the at least one of the latch arms when the at least one of the latch arms moves relative to the latch arm guide.

16. The fluid transfer system of claim 13, further comprising an actuator operably coupled to the cam tube to rotate the cam tube.

17. The fluid transfer system of claim 16 wherein the cam tube carries a gear for coupling the actuator to the cam tube.

18. The fluid transfer system of claim 13, further comprising a spring positioned to bias the at least one of the latch arms toward an open position or a closed position.

19. A fluid transfer system for space vehicles, comprising:
    a first coupler configured to be carried by a first space vehicle;
    a first valve device carried by the first coupler;
    a second coupler configured to be carried by a second space vehicle; and
    a second valve device carried by the second coupler; wherein:
    the first coupler includes rotatable and translatable latch arms positioned to engage with and connect to the second coupler, an actuator operably coupled to the latch arms to move the latch arms between an open position and a closed position, and a spring motor operably coupled to the latch arms to move the latch arms to an open position if the actuator fails; and
the first valve device incudes a moveable probe that is insertable into the second valve device when the latch arms of the first coupler are connected to the second coupler to transfer fluid between the first and second valve devices.

20. The system of claim 19, further comprising a latch arm guide, wherein:
    the first coupler comprises a tube and a latch arm carrier;
    the latch arms are movably attached to the latch arm carrier;
    the latch arm carrier is translatable relative to the tube and relative to the latch arm guide; and
    translation of the latch arm carrier relative to the tube causes at least one of the latch arms to move relative to the latch arm guide while contacting the latch arm guide, wherein movement of the at least one latch arms while contacting the latch arm guide causes the at least one of the latch arms to pivot.

\* \* \* \* \*